(12) United States Patent
Sauer et al.

(10) Patent No.: US 11,875,468 B2
(45) Date of Patent: Jan. 16, 2024

(54) THREE-DIMENSIONAL (3D) IMAGE MODELING SYSTEMS AND METHODS FOR DETERMINING RESPECTIVE MID-SECTION DIMENSIONS OF INDIVIDUALS

(71) Applicant: The Procter & Gamble Company, Cincinnati, OH (US)

(72) Inventors: Andrew James Sauer, Cincinnati, OH (US); Scott Kendyl Stanley, Mason, OH (US); Alexander Eberhard Unger, Kelkheim (DE); Brad S. Hoekzema, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 115 days.

(21) Appl. No.: 17/835,019

(22) Filed: Jun. 8, 2022

(65) Prior Publication Data

US 2022/0415002 A1  Dec. 29, 2022

Related U.S. Application Data

(60) Provisional application No. 63/216,236, filed on Jun. 29, 2021.

(51) Int. Cl.
*G06T 19/20* (2011.01)
*G06Q 30/0601* (2023.01)
*G06T 17/20* (2006.01)

(52) U.S. Cl.
CPC .......... *G06T 19/20* (2013.01); *G06Q 30/0631* (2013.01); *G06T 17/20* (2013.01); *G06T 2219/2004* (2013.01)

(58) Field of Classification Search
None
See application file for complete search history.

(56) References Cited

U.S. PATENT DOCUMENTS

| 10,736,579 | B2 | 8/2020 | Van Berkel-wijnen |
| 11,037,222 | B1 | 6/2021 | Natesh et al. |
| 11,461,630 | B1 | 10/2022 | Black et al. |
| 2005/0256686 | A1* | 11/2005 | Stabelfeldt .............. G06F 30/23 703/6 |
| 2016/0063320 | A1* | 3/2016 | Liu .......................... H04N 5/33 348/77 |

(Continued)

OTHER PUBLICATIONS

All Office Actions; U.S. Appl. No. 17/835,008, filed Jun. 8, 2022.

(Continued)

*Primary Examiner* — Frank S Chen
(74) *Attorney, Agent, or Firm* — Daniel S. Albrecht

(57) ABSTRACT

Three-dimensional (3D) image modeling systems and methods are disclosed herein for determining respective mid-section dimensions of individuals. Digital image(s) depicting at least a mid-section portion of an individual are obtained. A fit finder application (app) determines a rough 3D model based on the digital image(s). A parametric 3D model of a predefined individual is mapped to the rough 3D model in virtual 3D space to generate a fitted 3D model indicative of a physical size of at least the mid-section portion of the individual in ordinary space. A mid-section dimension of the individual is then determined based on the fitted 3D model.

20 Claims, 9 Drawing Sheets

(56) References Cited

U.S. PATENT DOCUMENTS

| | | | |
|---|---|---|---|
| 2017/0075910 A1 | 3/2017 | Soto Matamala et al. | |
| 2018/0015379 A1* | 1/2018 | Pratt | A63H 9/00 |
| 2019/0060142 A1 | 2/2019 | Okuda et al. | |
| 2019/0220738 A1 | 7/2019 | Flank | |
| 2019/0258498 A1 | 8/2019 | Chandan et al. | |
| 2020/0058137 A1* | 2/2020 | Pujades | G06V 40/23 |
| 2020/0170564 A1 | 6/2020 | Jiang et al. | |
| 2020/0327549 A1 | 10/2020 | Zhou et al. | |
| 2020/0394451 A1 | 12/2020 | Baijal et al. | |
| 2021/0035185 A1 | 2/2021 | Lee et al. | |
| 2021/0108938 A1 | 4/2021 | Williams | |
| 2021/0233157 A1 | 7/2021 | Crutchfield, Jr. | |
| 2021/0287141 A1 | 9/2021 | Molloy et al. | |
| 2022/0191155 A1 | 6/2022 | Eidelman et al. | |
| 2022/0292595 A1 | 9/2022 | Li et al. | |

OTHER PUBLICATIONS

All Office Actions; U.S. Appl. No. 17/836,372, filed Jun. 9, 2022.
Unpublished U.S. Appl. No. 17/835,008, filed Jun. 8, 2022, to Jennifer Joan Gustin et. al.
Unpublished U.S. Appl. No. 17/836,372, filed Jun. 9, 2022, to Jennifer Joan Gustin et. al.

* cited by examiner

THREE-DIMENSIONAL (3D) IMAGE MODELING SYSTEMS AND METHODS FOR DETERMINING RESPECTIVE MID-SECTION DIMENSIONS OF INDIVIDUALS

CROSS REFERENCE TO RELATED APPLICATIONS

This application claims the benefit, under 35 U.S.C. § 119(e), of U.S. Provisional Application No. 63/216,236, filed Jun. 29, 2021, incorporated by reference herein in its entirety.

FIELD

The present disclosure generally relates to three-dimensional (3D) image modeling systems and methods, and more particularly to, three-dimensional (3D) image modeling systems and methods for determining respective mid-section dimensions of individuals.

BACKGROUND

Absorbent articles, such as diapers, training pants, and the like, are manufactured in a variety of sizes and configurations. Wearing an appropriate size is important in order to ensure the absorbent article is comfortable and performs properly. With the numerous product lines available for purchase, and with each product line typically having a plurality of sizing options, it may be challenging to determine which product line and which size is well-suited for a particular wearer. Additionally, disposable article sizes are typically recommended based on a wearer's weight, as opposed to physical dimensions of the wearer. The wearer's weight, however, can be a poor predictor of the wearer's actual physical dimensions, so choosing product size on the wearer's weight can lead to improper fit. Further, while knowledge of the physical dimensions of the wearer is relevant for proper disposable article fit, the physical dimensions of the wearer are not typically known and can be difficult to manually measure.

Prior art methods for addressing such problems include manual measurement, which can be error prone. Still further, prior art digital imaging methods require a scale object (e.g., such as piece of paper), to correctly estimate dimensions or otherwise scale digital image or objects within the digital images in order to determine 3D correlations. Still further, prior art 3D imaging solutions are inherently limited as they assume a well-behaved and posable subject or individual that can stand, or otherwise be positioned, without moving for a given time period (e.g., several seconds). In addition, many such prior art systems require specialized hardware which is expensive and not readily available to consumers. Such prior art methods can be error prone, inconvenient, and/or require additional steps by a user, which can result in the introduction of errors from erroneous practices or failure to adhere to instructions regarding scaling, dimension, or otherwise.

For the foregoing reasons, there is a need for 3D image modeling systems and methods for determining respective mid-section dimensions of infants, as further described herein.

SUMMARY

Generally, as described herein, 3D image modeling systems and methods are described for determining respective mid-section dimensions of individuals, e.g., including by way of non-limiting example, any of infants, young children, or other individuals unable to follow directions or remain still for extended periods of time. Such 3D image modeling systems and methods provide a digital imaging based solutions for overcoming problems that arise from correctly identifying dimensions of an infant. For example, the 3D image modeling systems and methods describe herein may be used to accurately determine a waist dimension, a leg dimension, and/or a rise dimension of an individual (e.g., infant).

More specifically, as described herein, a three-dimensional (3D) image modeling method is disclosed for determining respective mid-section dimensions of infants (e.g., individuals). The 3D image modeling method comprises obtaining, by one or more processors, one or more digital images of an individual (e.g., infant). Each of the one or more digital images depicts at least a mid-section portion of the individual (e.g., infant). The 3D image modeling method may further comprise determining, by a fit finder application (app) executing on the one or more processors, a rough 3D model based on the one or more digital images. The 3D image modeling method may further comprise mapping, by the fit finder app, a parametric 3D model of a predefined individual (e.g., infant) to the rough 3D model in virtual 3D space to generate a fitted 3D model. The fitted 3D model is indicative of a physical size of at least the mid-section portion of the individual (e.g., infant) in ordinary space. The 3D image modeling method may further comprise determining, by the fit finder app, a mid-section dimension of the individual (e.g., infant) based on the fitted 3D model.

In addition, as described herein, an image modeling system is disclosed. The 3D image modeling system is configured to determine respective mid-section dimensions of infants (e.g., individuals). The 3D image modeling system comprises one or more processors and a fit finder application (app) comprising computing instructions configured to execute on the one or more processors. The computing instructions of the fit finder app, when executed by the one or more processors, cause the one or more processors to obtain, by the one or more processors, one or more digital images of an individual (e.g., infant). Each of the one or more digital images depicts at least a mid-section portion of the individual (e.g., infant). The computing instructions of the fit finder app, when executed by the one or more processors, may further cause the one or more processors to determine, by the fit finder app executing on the one or more processors, a rough 3D model based on the one or more digital images. The computing instructions of the fit finder app, when executed by the one or more processors, may further cause the one or more processors to map a parametric 3D model of a predefined individual (e.g., infant) to the rough 3D model in virtual 3D space to generate a fitted 3D model. The fitted 3D model is indicative of a physical size of at least the mid-section portion of the individual (e.g., infant) in ordinary space. The computing instructions of the fit finder app, when executed by the one or more processors, may further cause the one or more processors to determine, by the fit finder app, a mid-section dimension of the individual (e.g., infant) based on the fitted 3D model.

Further, as described herein, a tangible, non-transitory computer-readable medium storing instructions for determining respective mid-section dimensions of infants (e.g., individuals) is disclosed. The instructions, when executed by one or more processors, may cause the one or more processors to obtain one or more digital images of an individual (e.g., infant). Each of the one or more digital images may depict at least a mid-section portion of the individual (e.g., infant). The instructions, when executed by one or more processors, may further cause the one or more processors to determine a rough 3D model based on the one or more digital images. The instructions, when executed by one or more processors, may further cause the one or more processors to map a parametric 3D model of a predefined individual (e.g., infant) to the rough 3D model in virtual 3D space to generate a fitted 3D model. The fitted 3D model is indicative of a physical size of at least the mid-section portion of the individual (e.g., infant) in ordinary space. The instructions, when executed by one or more processors, may further cause the one or more processors to determine a mid-section dimension of the individual (e.g., infant) based on the fitted 3D model.

The present disclosure relates to improvements to other technologies or technical fields at least because the present disclosure describes or introduces improvements to computing devices in the 3D image modeling field, whereby the three-dimensional (3D) image modeling systems and methods execute on imaging device(s) or computing devices and improves the field of 3D imaging and modeling, with digital based analysis of digital images of one or more digital images of an individual (e.g., infant) and implementing dimensioning of such infants (e.g., individuals). Such systems and methods are configured to operate using a reduced processing and/or memory, and thus can operate on limited compute and memory devices, including mobile devices. Such reduction frees up the computational resources of an underlying computing system, thereby making it more efficient.

Still further, the present disclosure relates to improvement to other technologies or technical fields at least because the present disclosure describes or introduces improvements to computing devices in the field of security and/or image processing, where, at least in some aspects, images of users may be preprocessed (e.g., cropped, blurred, obscured or otherwise modified) to define extracted or depicted regions of an individual (e.g., infant) without depicting personal identifiable information (PII) of the individual (e.g., infant). For example, a mid-section portion of an individual (e.g., infant) may be covered up (e.g., by a diaper), or in some aspects, the digital image by be blurred or otherwise obscured, at least with respect to certain areas, such as genital or other private areas. Additionally, or alternatively, simple cropped or redacted portions of an image may be used, which eliminates the need of transmission of images of individuals or portions of individuals across a computer network (where such images may be susceptible of interception by third parties). In addition, by using a predefined and/or fitted model, as described herein, an individual's data can be completely abstracted from any detailed PII as shown in an original image (e.g., surface textures, skin color, birthmarks, etc. all disappear). Such features provide a security improvement, i.e., where the removal of PII (e.g., private area features) provides an improvement over prior systems because cropped or redacted images, especially ones that may be transmitted over a network (e.g., the Internet), are more secure without including PII information of an individual. Accordingly, the systems and methods described herein operate without the need for such essential information, which provides an improvement, e.g., a security improvement, over prior systems. In addition, the use of cropped, modified, or obscured images, at least in some aspects, allows the underlying system to store and/or process smaller data size images, which results in a performance increase to the underlying system as a whole because the smaller data size images require less storage memory and/or processing resources to store, process, and/or otherwise manipulate by the underlying computer system.

In addition, the present disclosure includes specific features other than what is well-understood, routine, conventional activity in the field, and that add unconventional steps that confine the claim to a particular useful application, e.g., three-dimensional (3D) image modeling systems and methods for determining respective mid-section dimensions of infants (e.g., individuals). The disclosed 3D image modeling systems and methods improve the accuracy of sizing of an absorbent article (e.g., a diaper) compared to use of conventional weight range. This provides a significant improvement over prior art systems and/or methods that use or rely on a single dimension of measurement or a limited number of dimensions, such as reliance on flat 2D images without 3D imaging enhancements as described herein. Additional advantages of the disclosed 3D image modeling systems and methods as further include the ability to capture 3D data from infants or other individuals who cannot follow instructions or remain still for image capture; elimination of specialized hardware often required to collect 3D data; the ability to extract useful data from a relatively low quality starting dataset (e.g., a rough 3d model); and elimination of scale objects and other inconvenient requirements to achieve 3D imaging.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein.

Figure 1:
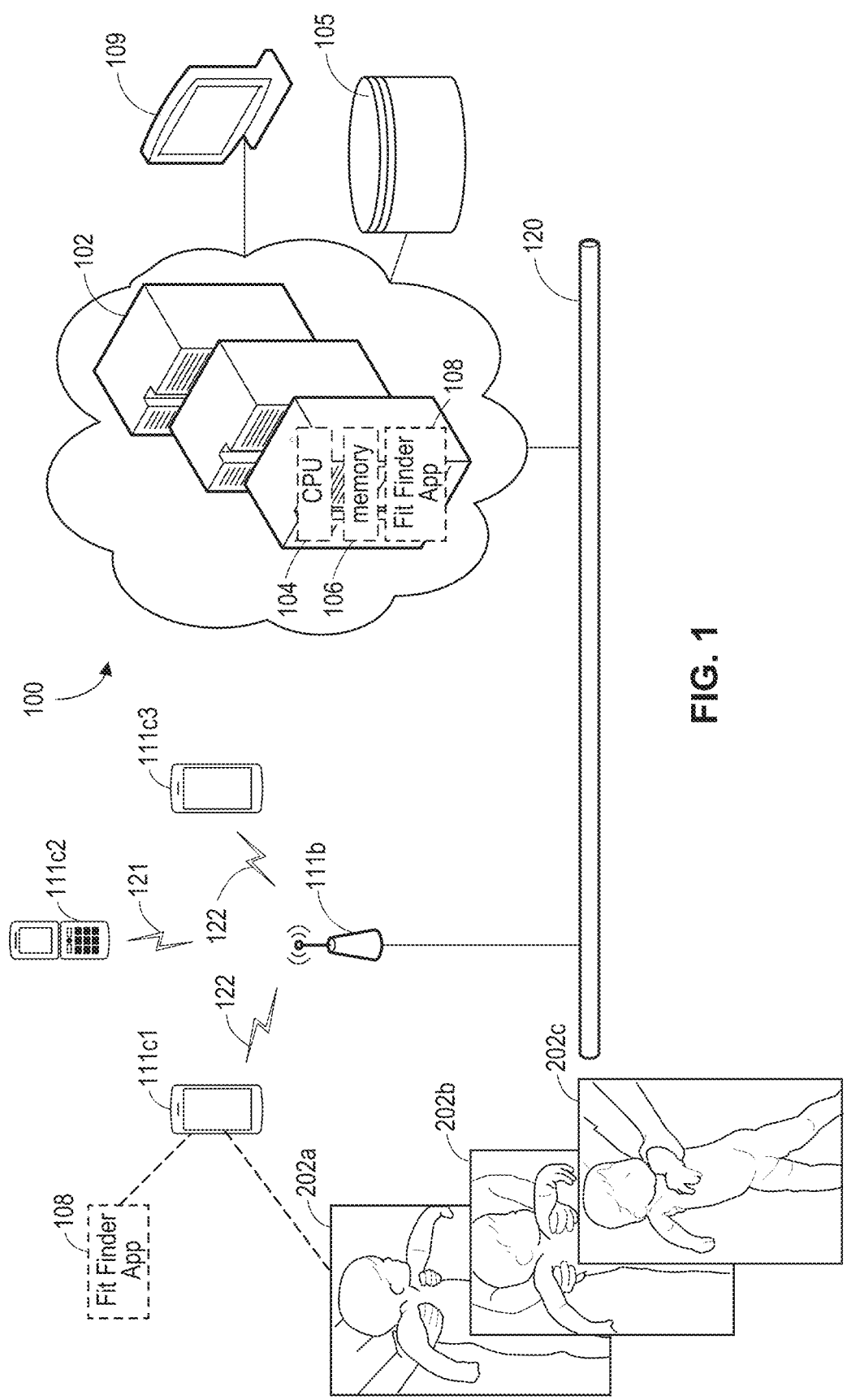
FIG. 1 illustrates an example three-dimensional (3D) image modeling system configured to determine respective mid-section dimensions of infants (e.g., individuals), in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION OF THE INVENTION

The present disclosure relates to three-dimensional (3D) image modeling systems and methods for determining respective mid-section dimensions of infants (e.g., individuals). Such systems and methods comprise recommending a size and/or dimension(s) of a disposable article (e.g., a diaper) based on the processing of an image to determine the physical attributes of the intended wearer (e.g., an individual (e.g., infant)). Various non-limiting embodiments of the present disclosure will now be described to provide an overall understanding of the principles of the function, design and operation of the manufacturing systems and methods. One or more examples of these non-limiting embodiments are illustrated in the accompanying drawings. Those of ordinary skill in the art will understand that the systems and methods described herein and illustrated in the accompanying drawings are non-limiting example embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

The term "absorbent article," as used herein, refers to disposable garments or devices such as diapers, including, by way of non-limiting example, individual (e.g., infant), child, adult diapers, pant-style diapers, training pants, feminine hygiene products and the like, which are placed against or in proximity to the body of the wearer to absorb and contain the various exudates discharged from the body. Typically, these articles comprise a topsheet, backsheet, an absorbent core, an acquisition system (which may be referred to as a liquid management system and may be comprised of one or several layers) and typically other components, with the absorbent core normally placed at least partially between the backsheet and the acquisition system or between the topsheet and the backsheet. Nothing in this description should be, however, considered limiting to the scope of the claims. Instead, the present disclosure applies to any suitable form of absorbent articles (e.g., training pants, feminine hygiene products, adult incontinence products, etc.). For instance, the systems and methods described herein are applicable for use with a range of different absorbent article types, such as disposable, semi-durable, single use, multiple use, multi-part, cloth, pant, pull-up or insert types of absorbent articles and products. Absorbent articles in accordance with the present disclosure can be pre-made, such that they are manufactured in predetermined sizes that are configured to be worn by wearers having certain physical attributes. In some embodiments, absorbent articles in accordance with the present disclosure are at least partially customizable, such as that certain aspects can be configured based on the physical attributes of the intended wearer. By way of example, a leg hoop size and/or dimension of the absorbent article to worn by a particular wearer can be custom sized and/or dimension to provide that particular wearer with a better fit.

In some configurations, the systems and methods described herein can receive one or more digital images of a subject (e.g., an individual (e.g., infant)), and by way of various image processing techniques, determine physical attributes of the subject. The subject can be, for example, an individual (e.g., infant), a baby, a toddler, or other wearer of an absorbent article. The particular physical attributes determined by the present systems and methods can vary based on implementation, but in some configurations, image analysis is performed to determine a mid-section dimension, which may comprise various fit parameters, for an individual (e.g., infant) or other wearer of an absorbent article. Examples of fit parameters include an estimated waist circumference or otherwise waist dimension of the subject, an estimated thigh circumference or otherwise leg dimension of the subject, and an estimated rise measurement or otherwise rise dimension of the subject, such as measured from naval to the lower back. The fit parameters can be applied to various sizing models of absorbent articles to assess which product or products would fit the subject. An absorbent article recommendation can then be provided for the subject. The recommendation can identify, for example, any of a product size, a product type, and a product line. In some configurations, additional information regarding the subject beyond the image can be used in determining the recommendation. Non-limiting examples of additional information regarding the subject or individual that can be leveraged by the systems and methods described herein include, but are not limited to, the subject's age, the subject's gestational age, gender, the subject's geographic location, and developmental milestone completion. Example developmental milestones can include, without limitation, crawling, pulling up on furniture, walking, commenced potty (i.e., bathroom) training, and so forth. Additionally or alternatively, dimensional information regarding the subject can be provided by a user, such as the subject's height, weight, head circumference, and so forth, which can be leveraged by the system in making an absorbent article recommendation. Additionally or alternatively, fit assessment or performance feedback regarding a currently used product can be provided as an input, as well as other use-based parameters such as number of bowel movement diapers per day or number of wet diapers per day. Additionally or alternatively, absorbent article preferences, such as preference for more natural product, preference for products suitable for more active children, preference for high absorbency or overnight products, and so forth, may be provided by a user and taken into consideration.

Other user-provided information may include, for example, whether the wearer is clothed or is only wearing a diaper, or this information may be determined by an algorithm, for example. In any of the above examples, data associated with a user profile, or other user-provided information, may be utilized in determining a recommendation. Additionally or alternatively, data obtained from public, private, and/or proprietary growth chart databases may be utilized in determining a recommendation. Such growth databases, or otherwise growth data comprising as the data stored therein, may, in some aspects, comprise proprietary growth chart data or databases, such as might be assembled from the data collected by the app itself and/or data or databases comprising an individual's specific growth trends, such as could be determined by a fit finder app (e.g., fit finder app 108) itself over time. Furthermore, the type of user-provided information utilized by the system can depend on the type of absorbent article being recommended. Additionally or alternatively, growth data and charts can be used as the wearer's age and/or weight changes significantly. For incontinence products, user-provided information can include incontinence type, current products used, and so forth.

The systems and methods described herein can be used to generate recommendations for a wide variety of absorbent articles, including, for example, products such as diapers. Thus, while many of the figures and examples described herein include a baby for illustrations purposes, this disclosure is not so limited. The image that is processed in accordance with the present disclosure can include the subject (e.g., image), such as a full body image, or a portion of the subject. The subject may be positioned in a variety of poses, e.g., such as subject lying flat on a flat surface.

FIG. 1 illustrates an example three-dimensional (3D) image modeling system 100 configured to determine respective mid-section dimensions of infants (e.g., individuals), in accordance with various aspects disclosed herein. Mid-section dimensions of an individual (e.g., infant) may be determined from one or more digital images (e.g., 202*a*, 202*b*, and/or 202*c*) of an individual (e.g., infant), where each of the one or more digital images depict at least a mid-section portion of the individual (e.g., infant). In some aspects, the digital images may be two-dimensional (2D). Additionally, or alternatively, the digital images may be three-dimensional (3D) or contain three dimensional data. The digital images may additionally or alternatively comprise 2D and/or 3D scans (e.g., where a computing includes a scanning function or capability), comprising respective 2D and/or 3D data of such scans. In various aspects, the digital image(s) (e.g., 202*a*, 202*b*, and/or 202*c*) may comprise various data types and/or formats as captured by various 2D and/or 3D imaging capture systems or cameras, including, by way of non-limiting example, light-detecting-and-ranging (LiDAR) based digital images, time-of-flight (ToF) based digital images, other similar types of images as captured by 2D and/or 3D imaging capture systems and/or cameras. For example, ToF based digital images, and/or related data, are determined from using a reference speed, e.g., the speed of light (or sound), to determine distance. ToF measures the time it takes for light (or sound) to leave a device (e.g., user computing device 111*c*1), bounce off an object, plane, and/or surface (e.g., an individual (e.g., infant)), and return to the device. Such time measurement can be used to determine the distance from the device to the object, plane, and/or surface. Such information can then be used to construct a 3D model (e.g., rough model) of the image captured, as further describe herein. More generally, LiDAR is a specific implementation of ToF that uses light and the speed of light for distance determination and 3D image determination. Generally, LiDAR specific implementation uses pulsed lasers to build a point cloud, which may then be used to construct a 3D map or image. Compared to LiDAR, typical implementations of ToF image analysis involves a similar, but different, creation "depth maps" based on light detection, usually through a standard RGB camera. With respect to the disclosure herein, LiDAR, ToF, and/or other 3D imaging techniques are compatible, and may each, together or alone, be used with, the disclosure and/or aspects herein. In various aspects, such digital images may be saved or stored in formats, including, but not limited to, e.g., JPG, TIFF, GIF, BMP, PNG, and/or other files, data types, and/or formats for saving or storing such images.

In addition, such digital images may comprise color and/or channel data, including by way of non-limiting example, red-green-blue (RGB) data, CIELAB (LAB) data, hue saturation value (HSV) data, and/or or other color formats and/channels. Such digital images may be captured, stored, processed, analyzed, and/or otherwise manipulated and used as described herein, by 3D image modeling system 100.

In the example aspect of FIG. 1, 3D image modeling system 100 includes server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, imaging server(s) 102 may be any one or more cloud-based platform(s) such as MICROSOFT AZURE, AMAZON AWS, or the like. Server(s) 102 may include one or more processor(s) 104 as well as one or more computer memories 106. In various aspects, server(s) 102 may be referred to herein as "imaging server(s)."

Memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 106 may store an operating system (OS) (e.g., Microsoft Windows, Linux, UNIX, etc.) capable of facilitating the functionalities, apps, methods, or other software as discussed herein. Memorie(s) 106 may also store a fit finder application (app) 108, which may comprise or may be configured to access an artificial intelligence based model, such as a machine learning model, trained on various digital images (e.g., images 202*a*, 202*b*, and/or 202*c*), as described herein. Additionally, or alternatively, digital images (e.g., which in some aspects, may serve as training images), such as any one or more of images 202*a*, 202*b*, and/or 202*c*, may also be stored in database 105, which is accessible or otherwise communicatively coupled to imaging server(s) 102. In addition, memories 106 may also store machine readable instructions, including any of one or more application(s) (e.g., an imaging application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more other applications may be envisioned and that are executed by the processor(s) 104. It should be appreciated that given the state of advancements of mobile computing devices, all of the processes functions and steps described herein may be present together on a mobile computing device (e.g., user computing device 111*c*1).

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 105 (e.g., a relational database, such as Oracle, DB2, MySQL, or a NoSQL based database, such as MongoDB). The data stored in memories 106 and/or database 105 may include all or part of any of the data or information described herein, including, for example, digital images, which may be used as training images (e.g., including any one or more of images 202a, 202b, and/or 202c) and/or other images and/or information of regarding a given absorbent article (e.g., such as a diaper) or diaper as used by individual (e.g., individual (e.g., infant)) or the individual himself or herself, including heath data, product metrics, reference data, or the like, or as otherwise described herein.

Imaging server(s) 102 may further include a communication component configured to communicate (e.g., send and receive) data via one or more external/network port(s) to one or more networks or local terminals, such as computer network 120 and/or terminal 109 (for rendering or visualizing) described herein. In some aspects, imaging server(s) 102 may include a client-server platform technology such as ASP.NET, Java J2EE, Ruby on Rails, Node.js, a web service or online API, responsive for receiving and responding to electronic requests. The imaging server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the imaging server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Imaging server(s) 102 may further include or implement an operator interface configured to present information to an administrator or operator and/or receive inputs from the administrator or operator. As shown in FIG. 1, an operator interface may provide a display screen (e.g., via terminal 109). Imaging server(s) 102 may also provide I/O components (e.g., ports, capacitive or resistive touch sensitive input panels, keys, buttons, lights, LEDs), which may be directly accessible via, or attached to, imaging server(s) 102 or may be indirectly accessible via or attached to terminal 109. According to some aspects, an administrator or operator may access the server 102 via terminal 109 to review information, make changes, input training data or images, initiate training of pose mapping learning model (e.g., as described for FIGS. 3 and 5, and/or otherwise herein), and/or perform other functions.

In some aspects, imaging server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, imaging server(s) 102 are communicatively connected, via computer network 120 to the one or more user computing devices 111c1-111c3 and/or 112c1-112c3 via base stations 111b and 112b. In some aspects, base stations 111b and 112b may comprise cellular base stations, such as cell towers, communicating to the one or more user computing devices 111c1-111c3 and 112c1-112c3 via wireless communications 121 based on any one or more of various mobile phone standards, including NMT, GSM, CDMA, UMMTS, LTE, 5G, or the like. Additionally, or alternatively, base stations 111b and 112b may comprise routers, wireless switches, or other such wireless connection points communicating to the one or more user computing devices 111c1-111c3 and 112c1-112c3 via wireless communications 122 based on any one or more of various wireless standards, including by non-limiting example, IEEE 802.11a/b/c/g (WIFI), the BLUETOOTH standard, or the like.

Any of the one or more user computing devices 111c1-111c3 and/or 112c1-112c3 may comprise mobile devices and/or client devices for accessing and/or communications with imaging server(s) 102. Such mobile devices may comprise one or more mobile processor(s) and/or an imaging device for capturing images, such as images as described herein (e.g., any one or more of images 202a, 202b, and/or 202c). In various aspects, user computing devices 111c1-111c3 and/or 112c1-112c3 may comprise a mobile phone (e.g., a cellular phone), a tablet device, a personal data assistance (PDA), or the like, including, by non-limiting example, an APPLE iPhone or iPad device or a GOOGLE ANDROID based mobile phone or tablet.

In various aspects, the one or more user computing devices 111c1-111c3 and/or 112c1-112c3 may implement or execute an operating system (OS) or mobile platform such as APPLE iOS and/or Google ANDROID operation system. Any of the one or more user computing devices 111c1-111c3 and/or 112c1-112c3 may comprise one or more processors and/or one or more memories for storing, implementing, or executing computing instructions or code, e.g., a mobile application, as described in various aspects herein. As shown in FIG. 1, fit finder app 108 and/or an imaging application as described herein, or at least portions thereof, may also be stored locally on a memory of a user computing device (e.g., user computing device 111c1).

User computing devices 111c1-111c3 and/or 112c1-112c3 may comprise a wireless transceiver to receive and transmit wireless communications 121 and/or 122 to and from base stations 111b and/or 112b. In various aspects, digital images (e.g., digital images 202a, 202b, and/or 202c) may be transmitted via computer network 120 to imaging server(s) 102 for imaging analysis as described herein.

In addition, the one or more user computing devices 111c1-111c3 and/or 112c1-112c3 may include a digital camera, digital video camera, and/or otherwise imaging capture device or system for capturing or taking digital images and/or frames (e.g., which can be any one or more of images 202a, 202b, and/or 202c). Each digital image may comprise LiDAR, ToF, and/or pixel data, which may be used for imaging analysis and/or training or implementing model(s), such as AI or machine learning models, as described herein. For example, a digital camera and/or digital video camera of, e.g., any of user computing devices 111c1-111c3 and/or 112c1-112c3, may be configured to take, capture, or otherwise generate digital images (e.g., digital images 202a, 202b, and/or 202c) and, at least in some aspects, may store such images in a memory of a respective user computing devices. Additionally, or alternatively, such digital images may also be transmitted to and/or stored on memorie(s) 106 and/or database 105 of server(s) 102.

Still further, each of the one or more user computer devices 111c1-111c3 and/or 112c1-112c3 may include a display screen for displaying graphics, images, text, mid-section dimension(s), product sizes, data, pixels, features, and/or other such visualizations or information as described herein. In various aspects, graphics, images, text, mid-section dimension(s), product sizes, data, pixels, features, and/or other such visualizations or information may be received from imaging server(s) 102 for display on the display screen of any one or more of user computer devices 111c1-111c3 and/or 112c1-112c3. Additionally, or alternatively, a user computer device may comprise, implement, have access to, render, or otherwise expose, at least in part, an interface or a guided user interface (GUI) for displaying text and/or images on its display screen. In various aspects, a display screen (e.g., display screen 900 as described for FIG. 9 herein) can also be used for providing instructions or guidance to the user of a given device (e.g., user computing device 111c1).

In some aspects, computing instructions and/or applications executing at the server (e.g., server(s) 102) and/or at a mobile device (e.g., mobile device 111c1) may be communicatively connected for analyzing LiDAR data, ToF data, and/or pixel data of one or more digital images depicting infants (e.g., individuals) and mid-sections thereof, as described herein. For example, one or more processors (e.g., processor(s) 104) of server(s) 102 may be communicatively coupled to a mobile device via a computer network (e.g., computer network 120). In such aspects, an imaging app may comprise a server app portion configured to execute on the one or more processors of the server (e.g., server(s) 102) and a mobile app portion configured to execute on one or more processors of the mobile device (e.g., any of one or more user computing devices 111c1-111c3 and/or 112c1-112c3) and/or other such standalone imaging device. In such aspects, the server app portion is configured to communicate with the mobile app portion. The server app portion or the mobile app portion may each be configured to implement, or partially implement, one or more of: (1) obtaining, by one or more processors, one or more digital images of an individual (e.g., infant), each of the one or more digital images depicting at least a mid-section portion of the individual (e.g., infant); (2) determining, by a fit finder application (app) executing on the one or more processors, a rough 3D model based on the one or more digital images; (3) mapping, by the fit finder app, a parametric 3D model of a predefined individual (e.g., infant) to the rough 3D model in virtual 3D space to generate a fitted 3D model, the fitted 3D model indicative of a physical size of at least the mid-section portion of the individual (e.g., infant) in ordinary space; and/or (4) determining, by the fit finder app, a mid-section dimension of the individual (e.g., infant) based on the fitted 3D model.

Figure 2:
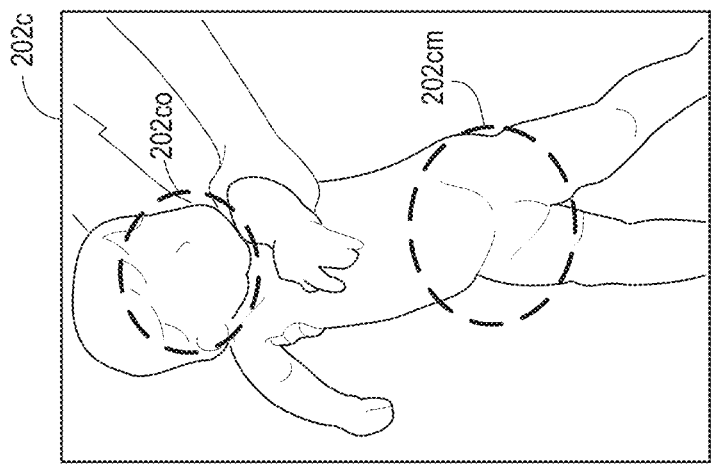
FIG. 2 illustrates an example digital images of an individual (e.g., infant) depicting at least a mid-section portion of the individual (e.g., infant), in accordance with various aspects disclosed herein.
Figure 2:
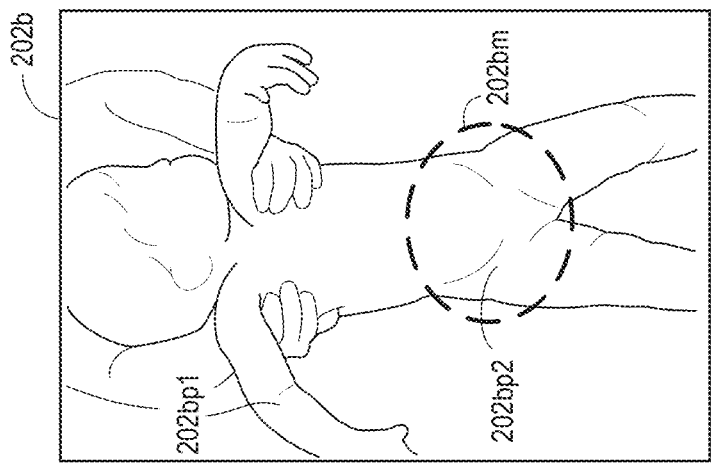
Figure 2:
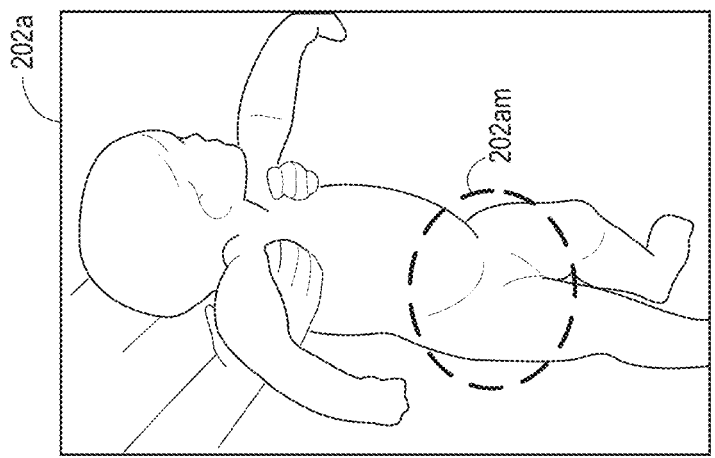

FIG. 2 illustrates an example digital images (e.g., digital images 202a, 202b, and 202c) of an individual (e.g., infant) depicting at least a mid-section portion of the individual (e.g., infant) (e.g., 202am, 202bm, and 202cm, respectively), in accordance with various aspects disclosed herein. In various aspects, images 202a, 202b, and/or 202c may each be digital images as captured by a digital camera or otherwise digital imaging capture devices, as described for FIG. 1. Each of digital images 202a, 202b, and/or 202c may be transmitted to and from server(s) 102 between or among any one or more of user computer devices (e.g., user computing devices 111c1-111c3 and/or 112c1-112c3) via computer network 120, as shown and described for FIG. 1.

More generally, digital images, such as example images 202a, 202b, and 202c, may be collected or aggregated at imaging server(s) 102 and may be used for imaging analysis as described herein. In addition, in some aspects, such digital images may be used to implement and/or train an artificial intelligence learning model (e.g., an AI model such as a machine learning imaging model as described herein). Such AI models may be used for pose analysis, positioning, or the like as described herein.

In various aspects, the digital images 202a, 202b, and 202c may be 2D and/or 3D digital images and may contain related 2D and/or 3D information. For example, in some aspects, user computing device (e.g., user computing device 111c1) may capture 3D images of an individual (e.g., infant) using a LiDAR, a ToF, and/or a photogrammetric 3D enabled imaging system or camera. Such image(s) may be then used to construct, generate, or otherwise determine a rough 3D model (e.g., rough 3D model 400 of FIG. 4) of the individual (e.g., infant) and related dimensions. The model may be generated or determined based on depth data obtained with LIDAR or ToF, specifically configured hardware and a calibration process for photogrammetric 3D systems, and/or otherwise where position data of one or more image(s) may be recovered and analyzed (e.g., placement of a standard camera and determining positions from accelerometers, scale objects, etc.). The model may be a rough or initial model as based on the LiDAR and/or ToF data, and may comprise visual or imaging "holes" or spaces in the surface of the rough 3D model. The rough 3D model may comprise image data loss, unfilled spaces, gaps, and/or the like, from imprecise image capture caused by, e.g., user error operating the camera or image capture device (e.g., at imprecise angles or perspectives) and/or the individual (e.g., infant) moving while the images are captured, etc. Other data capture issues may comprise determination or capture of only partial surfaces due to visual and/or field-of-view occlusion. For example, a camera may be unable image a back portion of an individual when he or she is laying down, and/or is unable to capture image data between the individual's legs without very careful camera placement, etc.). In addition, other data capture issues may comprise low resolution surfaces, e.g., to facilitate fast scanning and reduced processing power requirements. Still further, in various aspects, the digital images may be captured while an individual (e.g., infant) is situated in various poses or otherwise positions, such as laying on the ground (e.g., while sleeping or resting) playing or active, held (e.g., held in the air, as shown), wearing a diaper or not, or as otherwise may be captured in the individual (e.g., infant)'s natural positioning or natural environment, etc.

In addition, in various aspects, each of digital images (e.g., digital images 202a, 202b, and 202c) may comprise pixel data (e.g., RGB data) comprising feature data and corresponding to one or more image features, within the respective image. The pixel data may be captured by an imaging device of one of the user computing devices (e.g., one or more user computer devices 111c1-111c3 and/or 112c1-112c3). For example, with respect to digital images as described herein, pixel data (e.g., pixel data of the digital images 202a, 202b, and/or 202c) may comprise individual points or squares of data within an image, where each point or square represents a single pixel (e.g., each of pixel 202bp1, pixel 202bp2, and pixel 202bp3) within an image. Each pixel may be at a specific location within an image. In addition, each pixel may have a specific color (or lack thereof). Pixel color, may be determined by a color format and related channel data associated with a given pixel. For example, a popular color format is a 1976 CIELAB (also referenced herein as the "CIE L*-a*-b*" or simply "L*a*b*" or "LAB" color format) color format that is configured to mimic the human perception of color. Namely, the L*a*b* color format is designed such that the amount of numerical change in the three values representing the L*a*b* color format (e.g., L*, a*, and b*) corresponds roughly to the same amount of visually perceived change by a human. This color format is advantageous, for example, because the L*a*b* gamut (e.g., the complete subset of colors included as part of the color format) includes both the gamuts of Red (R), Green (G), and Blue (B) (collectively RGB) and Cyan (C), Magenta (M), Yellow (Y), and Black (K) (collectively CMYK) color formats.

In the L*a* b* color format, color is viewed as point in three dimensional space, as defined by the three-dimensional coordinate system (L*, a*, b*), where each of the L*data, the a*data, and the b* data may correspond to individual color channels, and may therefore be referenced as channel data. In this three-dimensional coordinate system, the L*axis describes the brightness (luminance) of the color with values from 0 (black) to 100 (white). The a*axis describes the green or red ratio of a color with positive a*values (+a*) indicating red hue and negative a*values (-a*) indicating green hue. The b* axis describes the blue or yellow ratio of a color with positive b* values (+b*) indicating yellow hue and negative b* values (-b*) indicating blue hue. Generally, the values corresponding to the a*and b* axes may be unbounded, such that the a*and b* axes may include any suitable numerical values to express the axis boundaries. However, the a*and b* axes may typically include lower and upper boundaries that range from approximately 150 to -150. Thus, in this manner, each pixel color value may be represented as a three-tuple of the L*, a*, and b* values to create a final color for a given pixel.

As another example, an additional or alternative color format includes the red-green-blue (RGB) format having red, green, and blue channels. That is, in the RGB format, data of a pixel is represented by three numerical RGB components (Red, Green, Blue), that may be referred to as a channel data, to manipulate the color of pixel's area within the image. In some implementations, the three RGB components may be represented as three 8-bit numbers for each pixel. Three 8-bit bytes (one byte for each of RGB) may be used to generate 24-bit color. Each 8-bit RGB component can have 256 possible values, ranging from 0 to 255 (i.e., in the base 2 binary system, an 8-bit byte can contain one of 256 numeric values ranging from 0 to 255). This channel data (R, G, and B) can be assigned a value from 0 to 255 that can be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values, for example, (Red=220, Green=220, Blue=220) is a light gray (near white), and (Red=40, Green=40, Blue=40) is a dark gray (near black).

In this way, the composite of three RGB values creates a final color for a given pixel. With a 24-bit RGB color image, using 3 bytes to define a color, there can be 256 shades of red, and 256 shades of green, and 256 shades of blue. This provides 256×256×256, i.e., 16.7 million possible combinations or colors for 24 bit RGB color images. As such, a pixel's RGB data value indicates a degree of color or light each of a Red, a Green, and a Blue pixel is comprised of. The three colors, and their intensity levels, are combined at that image pixel, i.e., at that pixel location on a display screen, to illuminate a display screen at that location with that color. In is to be understood, however, that other bit sizes, having fewer or more bits, e.g., 10-bits, may be used to result in fewer or more overall colors and ranges. Further, it is to be understood that the pixel data may contain additional or alternative color format and channel data. For example, the pixel data may include color data expressed in a hue saturation value (HSV) format or hue saturation lightness (HSL) format.

As a whole, the various pixels, positioned together in a grid pattern (e.g., comprising pixel data 202bp), form a digital image or portion thereof. A single digital image can comprise thousands or millions of pixels or channels. Images can be captured, generated, stored, and/or transmitted in a number of formats, such as JPEG, TIFF, PNG and GIF. These formats use pixels to store or represent the image.

With reference to FIG. 2, each of digital images 202a, 202b, and 202c illustrates an individual (e.g., infant) depicting at least a mid-section portion (e.g., mid-section 202am, 202bm, and 202cm, respectively) of the individual (e.g., infant). Each of the images may comprise a plurality of pixels. The pixel data, and features thereof, may define joints (e.g., hips, knees, shoulders, elbows, neck, etc.) of the individual (e.g., infant) that may be used to determine posture of the individual (e.g., infant). For example, pixels may define features determined from or otherwise based on one or more pixels in a digital image. For example, with respect to image 202a, pixels 202bp1 and 202bp2 may each comprise or be part of a pixel set or group of pixels depicting, or otherwise indicating, an elbow joint and hip joint respectively, where each pixel comprises a darker pixel color (e.g., pixels with relatively low L*values and/or pixels with lower RGB values) that are indicative of given feature (s) of the image. For example, groups of pixels can represent features of the image. That is, in a specific example, an edge of an individual's body may be determined by an abrupt change in RGB values indicating that the neighboring pixels belong to two different surfaces. A collection of surface edges can be used to determine a body outline, and the position of those edges relative to other parts of the body can be used to determine which body part has been located (e.g., a finger should be attached to a hand, which should be attached to an arm, etc.).

In addition to pixels 202bp1 and 202bp2, pixel data of digital image 202a (or other such digital images) includes various other pixels including remaining portions of the individual (e.g., infant), and may define the individual (e.g., infant)'s position, posture, etc., which may be analyzed as described herein, for example, for fit analysis and/or used for training of AI model(s), and/or analysis by already trained models. For example, pixel data of digital images 202a, 202b, and/or 202c may be used for pose manipulation, detection, or otherwise as described herein.

In some aspects, a digital image, such as a training image, an image as submitted by users, or otherwise a digital image (e.g., any of images 202a, 202b, and/or 202c), may be or may comprise a cropped or otherwise obscured image. Generally, a cropped or obscured image is an image with one or more pixels removed, deleted, hidden, or blurred, or otherwise altered from an originally captured image. For example, with reference to FIG. 2, image 202c represents an original image with the exception that at least obscured portion 202co has been blurred or hidden to remove, hide, or obscure portions of the individual (e.g., infant) (e.g., face of the individual (e.g., infant)) such that image 202c may not include personally identifiable information (PII). Additionally, or alternatively, mid-section portion 202cm (and respective portions 202am and 202bm) of the individual (e.g., infant) may be covered up (e.g., by a diaper), or in some aspects, the image as received by one or more processors (e.g., of server 102 and/or user computing device 111c1) may be blurred or otherwise obscured, at least with respect to certain areas, such as genital areas. In various aspects, analyzing and/or use of cropped or obscured images for training can improve the efficiency and performance of the underlying computer system in that such system processes, stores, and/or transfers smaller size digital images. In addition, such features provide a security improvement, i.e., where the removal of PII provides an improvement over prior systems because cropped or redacted images, especially ones that may be transmitted over a network (e.g., the Internet), are more secure without including PII information of an individual. Importantly, the systems and methods described herein may operate without the need for such non-essential information, which provides an improvement, e.g., a security and a performance improvement, over conventional systems. Moreover, while FIG. 2 may depict and describe cropped or obscured images, it is to be understood, however, that other image types including, but not limited to, original, non-cropped and/or non-obscured images (e.g., original image 202a and/or 202b) may be used or substituted as well.

In various aspects, digital images (e.g., images 202a, 202b, and 202c), whether used for image analysis, training images, AI-related images, etc., may comprise multiple angles or perspectives depicting different angles, viewpoints, perspectives, or portions of infants (e.g., individuals) depicting at least a mid-section portion of the individual (e.g., infant). The multiple angles or perspectives may include different views, positions, closeness of the individual (e.g., infant) and related diapers, portions of the individual (e.g., infant), diaper portions, and/or backgrounds, lighting conditions, or otherwise environments in which the individual (e.g., infant) and/or individual (e.g., infant) and/or mid-section portion of the individual (e.g., infant) is positioned within in a given image.

Figure 3:
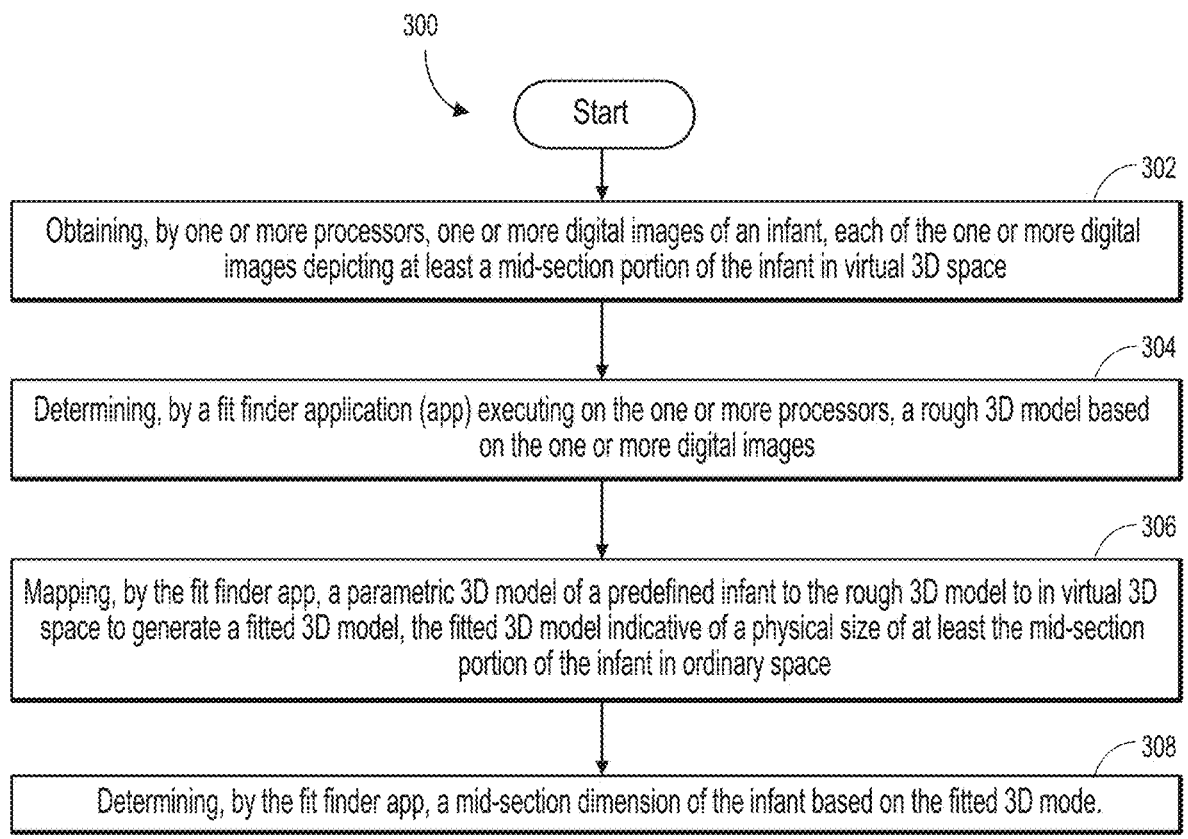
FIG. 3 illustrates an example three-dimensional (3D) image modeling method for determining respective mid-section dimensions of infants (e.g., individuals), in accordance with various aspects disclosed herein.

FIG. 3 illustrates an example three-dimensional (3D) image modeling method 300 for determining respective mid-section dimensions of infants (e.g., individuals), in accordance with various aspects disclosed herein. With reference to FIG. 3, at block 302, 3D image modeling method 300 comprises obtaining, by one or more processors, one or more digital images (e.g., digital images 202a, 202b, and/or 202c) of an individual (e.g., infant). The one or more processors may comprise local processors ("edge" processors) (e.g., processor(s) operating on user computing device 111c1) and/or server (cloud) processors (e.g., processor(s) operating on imaging server(s) 102). In some aspects, the one or more processors may be processors of a LUMI device as provided by the PAMPERS brand, where the LUMI device comprises a camera for capturing digital image(s) (e.g., digital images 202a, 202b, and/or 202c). In some aspects, the LUMI device may be positioned at or near an individual (e.g., infant) (e.g., near a baby crib or otherwise) for obtaining digital image(s) depicting at least a mid-section portion of the individual (e.g., infant), as described herein. The 2D, 3D, and/or pixel data may be analyzed on the local processors and/or server processor(s)), for example, by the fit finder app 108, and/or portions thereof comprising different sets of instructions for server-client communication, communicating across computer network 120. It is to be understood that in some aspects analysis, e.g., such as analysis or generation of a rough 3D model, as described herein, may be performed, created, or otherwise generated as without the need for digital data transmission to a server, where such generation occurs entirely on local processors of a user computing device (e.g., user computing device 111c1).

Each of the one or more digital images depicting at least a mid-section portion of the individual (e.g., infant). For example, such digital images may comprise those as shown and described for FIG. 2, including image 202a, 202b, and/or 202c. Digital images, as used with the method 300, and more generally as described herein, may comprise 2D, 3D, and/or pixel based images as captured by a digital camera or otherwise an imaging device (e.g., an imaging device, such as camera of user computing device 111c1). In some aspects, a digital image may comprise or refer to a plurality of images such as a plurality of images (e.g., frames) as collected using a digital video camera of a user computing device 111c1. Frames comprise consecutive images defining motion, and can comprise a movie, a video, or the like.

Additionally or alternatively, at least in some aspects, digital images (e.g., such as any one or more of images 202a, 202b, and/or 202c) can be generated by analyzing 2D images and scale object or reference object (e.g., an 8.5×11 paper). In such aspects, the scale object could be analyzed from various angles, to correctly scale the digital images for fit analysis, e.g., determining a mid-section dimension of the individual (e.g., infant) as described herein. It is to be understood, however, that such scale objects or markers are not necessary for the invention described herein.

With reference to FIG. 3, at block 304, 3D image modeling method 300 comprises determining, by a fit finder application (app) (e.g., fit finder app 108) executing on the one or more processors (e.g., processors of user computing device 111c1 and/or server(s) 102), a rough 3D model (e.g., rough model 400 as shown and described for FIG. 4) based on the one or more digital images (e.g., digital images 202*a*, 202*b*, and/or 202*c*).

Figure 4:
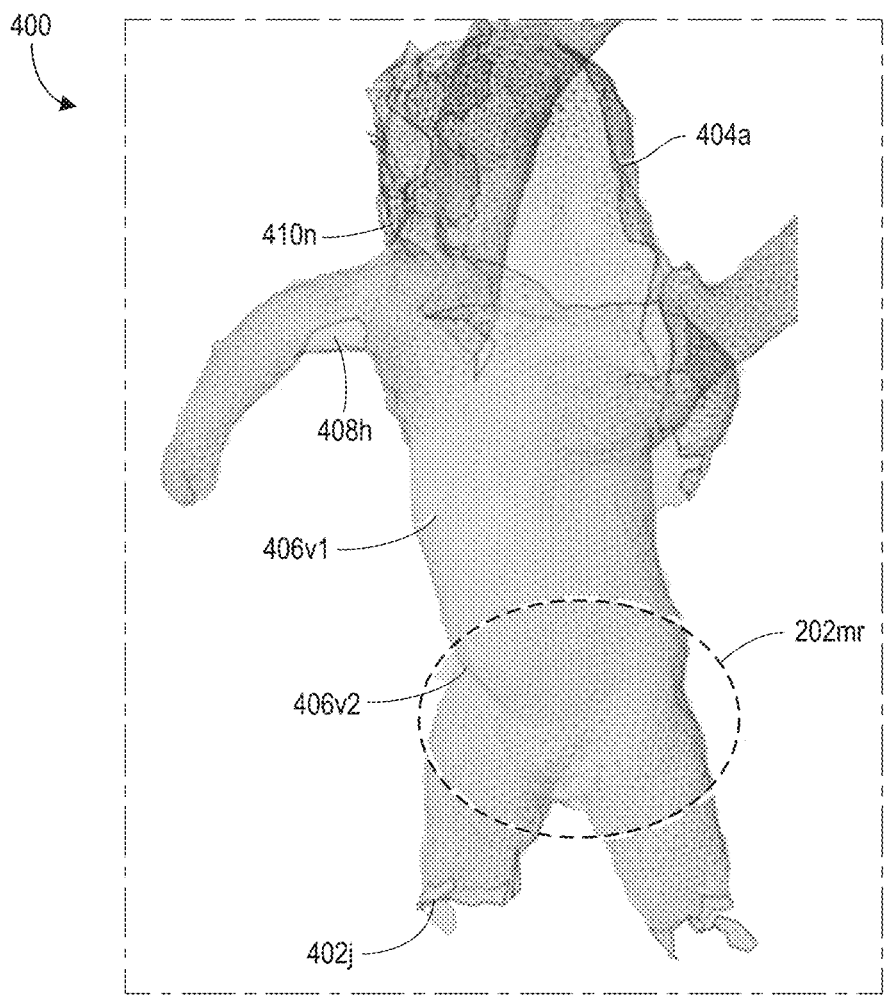
FIG. 4 illustrates an example rough 3D model, in accordance with various aspects disclosed herein.

FIG. 4 illustrates an example rough 3D model 400, in accordance with various aspects disclosed herein. Rough 3D model 400 may be based on digital image information, such as ToF and/or LiDAR data of LiDAR and/or ToF based digital images. For example, as shown for FIG. 4, rough 3D model 400 depicts a portion of a 3D surface of an individual (e.g., infant) as constructed, generated, or otherwise determined from digital images (e.g., 202*a*, 202*b*, and/or 202*c*). As shown, rough model 400, as constructed from digital images (e.g., 202*a*, 202*b*, and/or 202*c*), comprises missing data, surfaces, and other loss of information, e.g., including jagged edges 402*j*, the absence of a back surface 404*a* of the mesh surface of rough model 400, and random distribution of vertices (e.g., vertex 406*v*1 and vertex 406*v*2) making for an incomplete or imperfect model. In the aspect of FIG. 4, additional image defects or lost data comprises imaging artifacts such as a hole 408*h* under the individual (e.g., infant)'s right arm and garbled mesh around the neck 410*n*. It should be noted, however, that rough 3D model 400 comprises at least a rough mid-section portion (e.g., rough mid-section portion 202*mr*) of the individual (e.g., infant), e.g., corresponding to mid-section portions 202*am*, 202*bm*, and/or 202*cm* as described for FIG. 2. In general, rough 3D models may comprise higher, lower, or the same quality (e.g., more, fewer, or the same vertices) as shown for FIG. 4.

Figure 6:
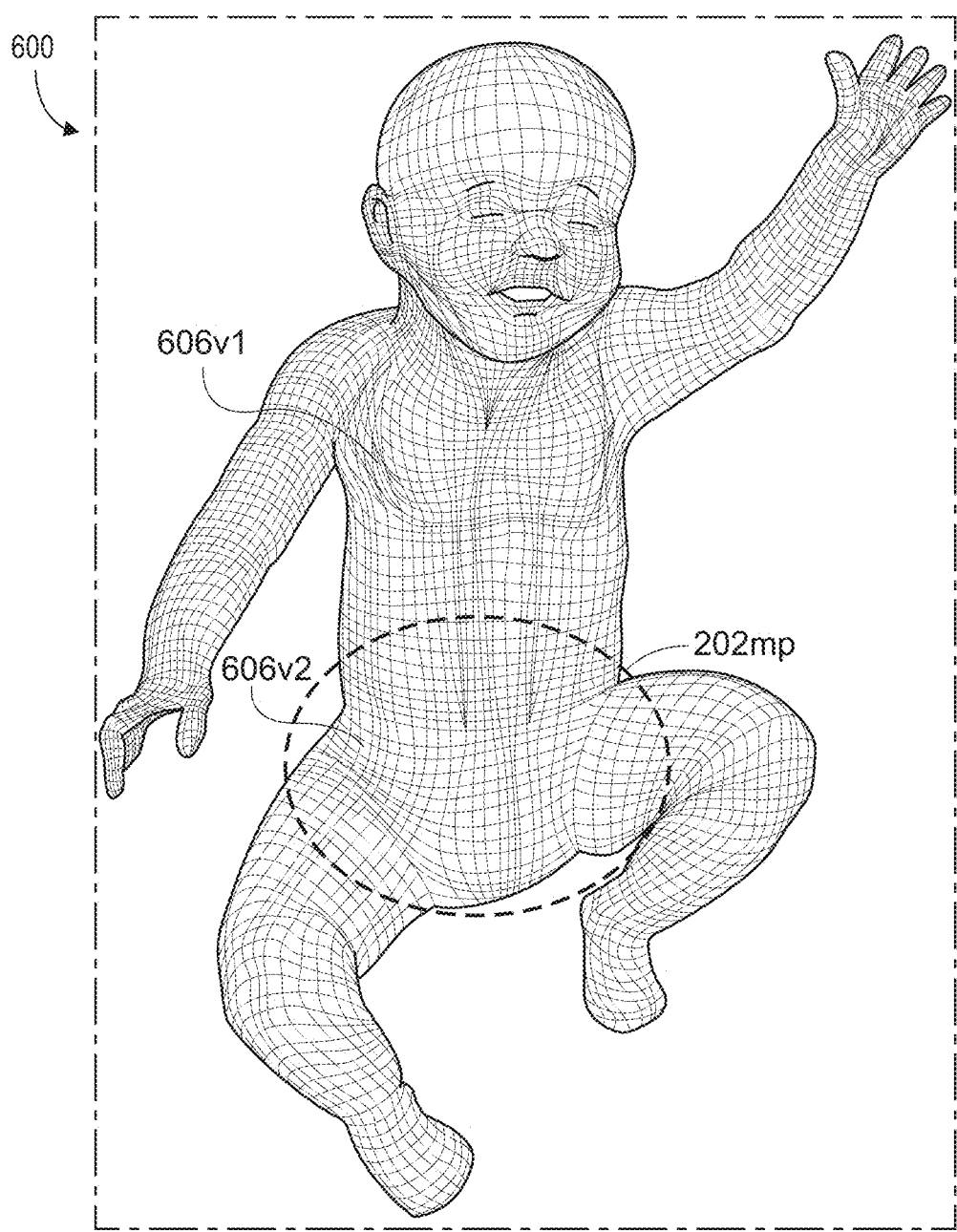
FIG. 6 illustrates an example parametric 3D model of a predefined individual (e.g., infant), in accordance with various aspects disclosed herein.
Figure 7:
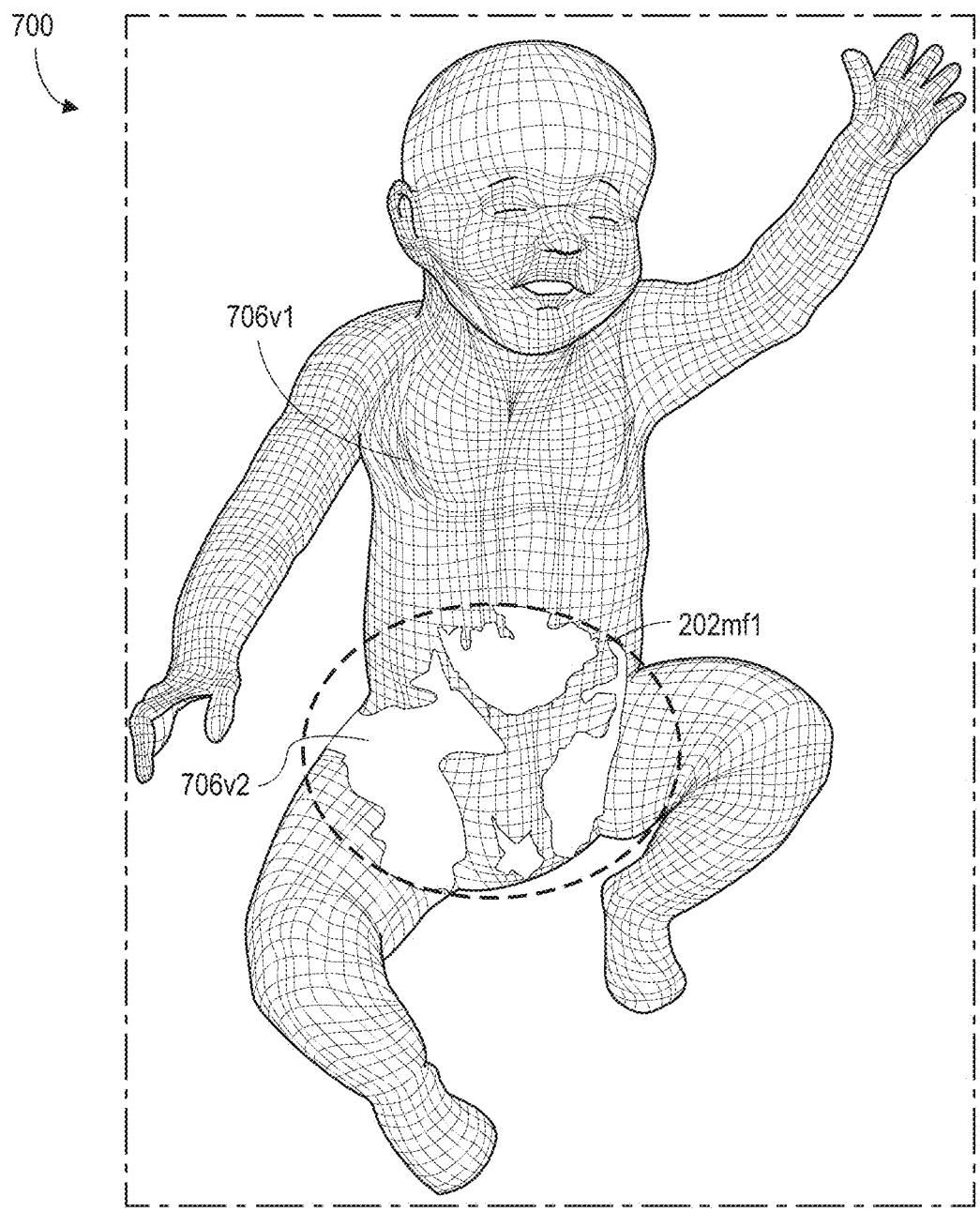
FIG. 7 illustrates an example an example fitted 3D model, in accordance with various aspects disclosed herein.
Figure 8:
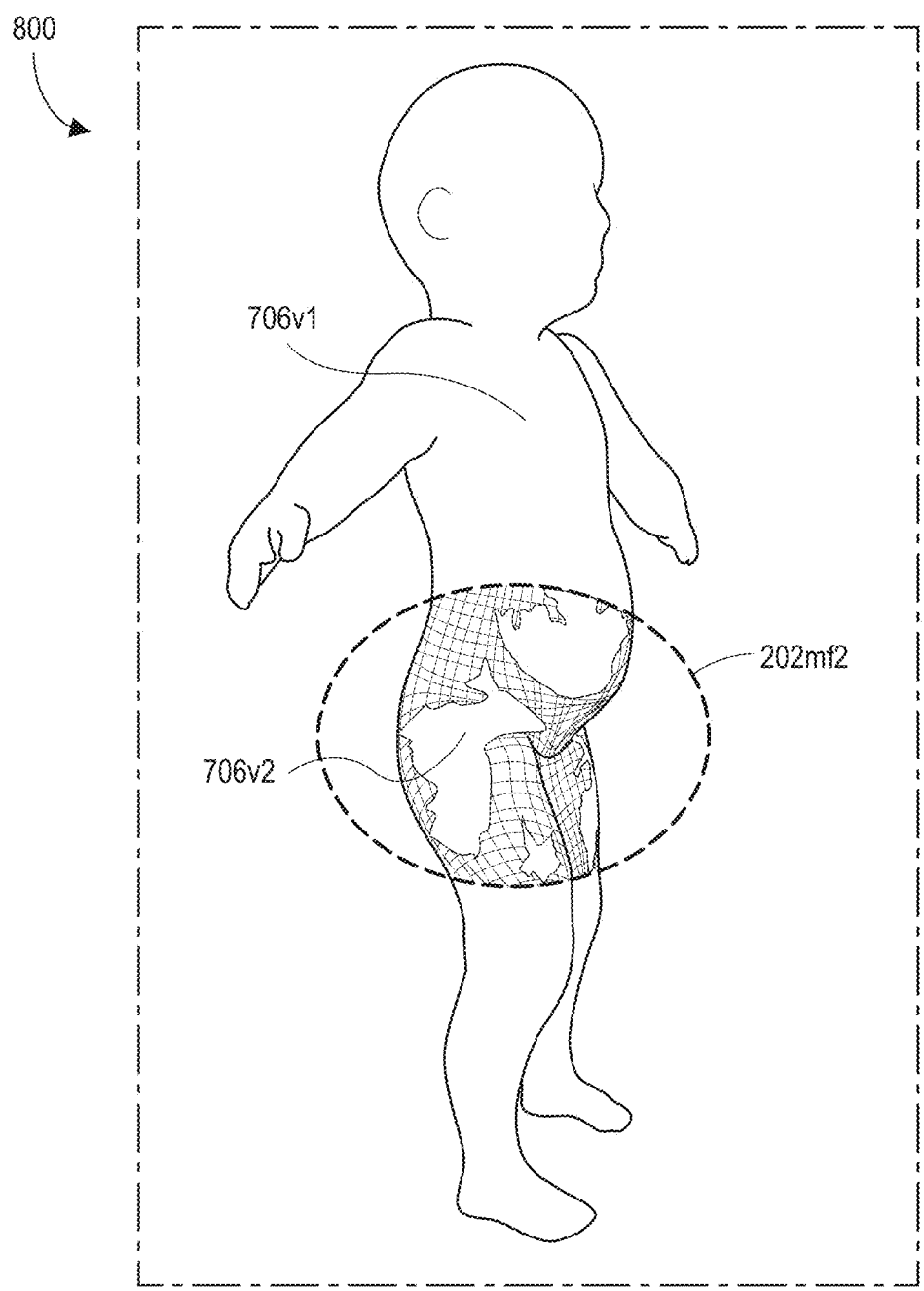
FIG. 8 illustrates a further example fitted 3D model representing a re-posed version of the fitted 3D model of FIG. 7, in accordance with various aspects disclosed herein.

With reference to FIG. 3, at block 306, 3D image modeling method 300 comprises mapping, by the fit finder app (e.g., fit finder app 108), a parametric 3D model of a predefined individual (e.g., infant) (e.g., parametric model 600 as shown and described for FIG. 6) to the rough 3D model (e.g., rough 3D model 400) in virtual 3D space to generate a fitted 3D model (e.g., fitted 3D models 700 and 800 as shown and described herein for FIGS. 7 and 8). A fitted 3D model is indicative of a physical size of at least the mid-section portion of the individual (e.g., infant) in ordinary space (e.g., in real-world physical space), and may be used to determine sizes of products (e.g., absorbent articles, such as diapers) which may fit the individual (e.g., infant) in ordinary space.

FIG. 6 illustrates an example parametric 3D model 600 of a predefined individual (e.g., infant), in accordance with various aspects disclosed herein. The parametric 3D model 600 may be predefined in that it was created for a specific age group, category, and/or size or dimension of individual (e.g., infant). In some aspects, parametric 3D model 600 may be selected from an array of parametric models, where parametric 3D model 600 is determined and selected from based on its similarity (e.g., size, shape, dimension, etc.) compared to a rough 3D model (e.g., rough 3D model 400). Still further, the parametric 3D model 600 may be repositioned, moved, and/or reposed to align with the rough 3D model and/or facilitate measurement extraction and/or matching. The parametric 3D model 600 may be of a similar age, category, size and/or dimension as the individual (e.g., infant) appearing in digital images 202*a*, 202*b*, 202*c*, and/or rough 3D model 400. In various aspects, the rough 3D model (e.g., rough 3D model 400) comprises a rough surface of at least the mid-section portion (e.g., rough mid-section portion 202*mr*) of the individual (e.g., infant) in virtual 3D space. The parametric 3D model (e.g., parametric 3D model 600) may likewise comprise a refined surface of at least a mid-section portion (e.g., predefined mid-section portion 202*mp*) of the predefined individual (e.g., infant) in virtual 3D space. The parametric 3D model 600 generally has a higher quality (e.g., additional vertices, a more well-defined surface, and/or less data or less surface loss compared to the rough 3D model 400).

For example, the parametric 3D model (e.g., parametric 3D model 600) is designed to have a geometry which is well-defined with respect to scaling, posing, and surface dimensions and data (e.g., such as vertices being placed in well-defined, well-formed, and/or well-spaced positions). Whereas a scanned or sculpted model, such as rough 3D model 400, has a lower quality and/or less well-defined imaging aspects. Mapping a parametric 3D model (e.g., example parametric 3D model 600) to a rough 3D model (e.g., rough 3D model 400) allows for the errors and lost data of the rough 3D model 400 to be restored, replaced, or otherwise emulated based on the well-defined imaging aspects of the example parametric 3D model 600. In one example, the parametric 3D model may be mapped on the rough 3D model via mapping vertices of each model together. For example, in some aspects, the rough surface of rough 3D model 400 may comprise rough vertices (e.g., vertices 406*v*1 and 406*v*2), and the refined surface of parametric 3D model 600 may comprise refined vertices (e.g., vertices 606*v*1 and 606*v*2). Mapping the two models (e.g., rough 3D model 400 and example parametric 3D model 600) may comprise mapping the surfaces of the models together by pairing up or positioning one or more of vertices, such as a subset of vertices (e.g., vertices 406*v*1 and 406*v*2 and vertices 606*v*1 and 606*v*2, respectively), where such vertices comprise vertices as recognized in with both models (e.g., located on the model of the individual (e.g., infant)'s chest for vertices 406*v*1 and 606*v*1 and waist for vertices 406*v*2 and 606*v*2, respectively). Additionally, or alternatively, other vertices may be used, such as vertices on the mid-section portion of the individual (e.g., infant). Additionally, or alternatively, mapping the two models (e.g., rough 3D model 400 and example parametric 3D model 600) may comprise mapping the surfaces of the models together by matching the surfaces of the two models together in 3D space.

It is to be understood that other method of mapping (not relying on vertices) may also be used. For example, in general, models may be mapped based on conformance of the shape of the two models (e.g., rough 3D model 400 and parametric 3D model 600). In one example, parametric 3D model 600 parametric model may comprise a Parasolid (e.g., a mathematically defined surface, with no vertices) while the rough 3D model 400 may comprise a point cloud (with no vertices), where such models could be mapped together, e.g., where the points of the point cloud of the rough 3D model 400 could be mapped to the surface of the Parasolid of the parametric 3D model 600. Other mappings are contemplated herein as well, including a voxel based mapping and/or a 3D mathematical functional mapping (e.g., based on a spherical formula defining a spherical shape or surface).

It is to be appreciated that various types of models, whether as may be defined by vertices, point clouds, voxels, formulas, etc. may be mapped together for creation or generation of a fitted model as described herein. For example, a fitted 3D model (e.g., fitted 3D model 700 and/or fitted 3D model 800 as shown and described for FIGS. 7 and 8) may be generated from mapping the refined surface of the parametric 3D model 600 (e.g., parametric 3D model 600) to the rough surface of the rough 3D model (e.g., rough 3D model 400).

In some aspects, 3D image modeling method 300 may further comprise determining, by the fit finder app, a pose of the individual (e.g., infant) based on the one or more digital images (e.g., digital images 202a, 202b, and/or 202c) or the rough 3D model (e.g., rough 3D model 400). In various aspects, mapping the rough 3D model (e.g., rough 3D model 400) to the parametric 3D model (e.g., example parametric 3D model 600) further comprises outputting or manipulating the parametric 3D model into a same pose as the pose of the individual (e.g., infant), for example, as shown and described with respect to FIG. 5.

Figure 5:
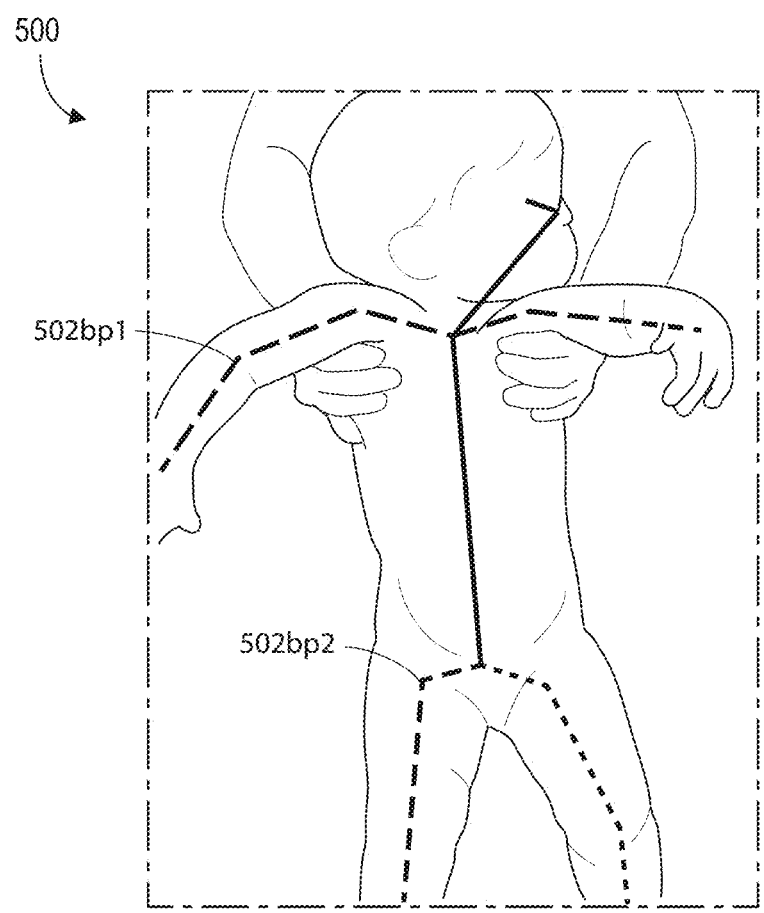
FIG. 5 illustrates an example digital image comprising pose information of the individual (e.g., infant) of FIG. 2, in accordance with various aspects disclosed herein.

FIG. 5 illustrates an example digital image 500 comprising pose information of the individual (e.g., infant) of FIG. 2 (e.g., digital image 202b), in accordance with various aspects disclosed herein. Pose information may comprise coordinate data defining a location of the body of the individual (e.g., infant). Such coordinate data may comprise joint location data indicating a location with the digital image or model of, e.g., a hip joint, elbow joint, etc. In general, joint based locations provide reference points of positioning of the human body for digital imaging and mapping. In other aspects, coordinate data could also define an outline of the body of the individual (e.g., infant).

Generally, coordinate data is used for pose-matching, where the pose of the individual (e.g., infant), as determined from captured digital images (e.g., images 202a, 202b, and/or 202c), can be used to map or line up to the surfaces of a rough 3D model and/or the example parametric 3D model. Pixel data may be used to determine coordinate data, where pixels of known coordinates across models may be aligned to map the pose of one model on another. Additionally, or alternatively, coordinate data may be determined from points (e.g., vertices, voxels, etc.) of the 3D models (e.g., rough 3D model 400 and/or example parametric 3D model 600). For example, pixels 202bp1 and 502bp1 may be used to map or otherwise align the poses of rough 3D model 400 and parametric 3D model 600. In some aspects, OPENPOSE software may be used to determine or detect coordinate information within digital images and/or models. Additionally, or alternatively, other pose software and/or pose models such as, or as provided by, POSENET, HRNET, WRNCHAI, BODYNET, NEURAL BODY FIT, CSANET, ALPHAPOSE, and/or the like may also be used. For example, in some aspects, a pose model (e.g., such as OPENPOSE model) may be executed or run 2D images (e.g., images 202a, 202b, and/or 202c). Additionally, or alternatively, a different pose model may be run or executed on for the rough 3d model (e.g., rough 3D model 400). Each of these models estimates the location and/or angle of the joints. In aspects using a 2D pose model, a 2D pose model provides 2D angles. In such aspects, output of multiple 2D pose models may be combined to reconstruct 3D joint angles. In aspects using a 3D pose model, a 3D pose model can already include 3D joint angles. In such aspects, a parametric model may be rigged or predefined, meaning that each vertex or portion of its surface is associated to a virtual skeleton. Such virtual skeleton is further associated to itself such that it remains connected together in 3D space. The 3D model may be manipulated in 3D space, e.g., instructed such that the shoulder joint is rotated upwards, where the arms bones and hand bones must follow along, and with them any portion of the 3d surface associated with those bones. A 3D parametric body may include a defined a pose, e.g., which may be defined as part of its creation. Once one or more 3D angles of the joints in the 2D images and/or rough 3d model are determined, the corresponding joint angles may be set or established in the parametric model. The parametric model may then be deformed or manipulated in 3D space in to a same pose as the rough model. Once the parametric model is posed correctly, its surface can be further deformed or manipulated (e.g., scaled, for example make an arm longer or shorter, or a leg thicker or thinner, etc.) so that surface(s) of the parametric model coincides with surface(s) of the rough model. Once the two models are mapped, then the pose of the individual (e.g., infant) may be digitally manipulated in virtual space to re-pose the individual (e.g., infant), as described for FIGS. 7 and 8 herein.

In some aspects, an artificial intelligence model may be trained and used to determine a pose of an individual (e.g., infant) in a digital image. In various aspects, for example, mapping the rough 3D model (e.g., rough 3D model 400) to the parametric 3D model (e.g., example parametric 3D model 600) further comprises inputting one or more digital images (e.g., 202a, 202b, and/or 202c) into a pose mapping learning model electronically accessible by the fit finder app (e.g., fit finder app 108). In some aspects, the pose mapping model may be trained on datasets (e.g., images) of individuals (e.g., infants and/or non-infants).

In various aspects, a pose mapping learning model comprises an artificial intelligence (AI) based model trained with at least one AI algorithm. Training of the pose mapping learning model involves image analysis of the training images to configure weights of the pose mapping learning model, and its underlying algorithm (e.g., machine learning or artificial intelligence algorithm) used to predict and/or classify future images. For example, in various aspects herein, generation of the pose mapping learning model involves training the pose mapping learning model with the plurality of training images such as described herein. In some aspects, one or more processors of a server or a cloud-based computing platform (e.g., imaging server(s) 102) may receive the plurality of training images of the plurality of individuals via a computer network (e.g., computer network 120). In such aspects, the server and/or the cloud-based computing platform may train the pose mapping learning model with the LiDAR data, ToF data, and/or pixel data (and/or coordinate data determined therefrom) of the plurality of training images.

In various aspects, a machine learning imaging model, as described herein (e.g. pose mapping learning model), may be trained using a supervised or unsupervised machine learning program or algorithm. The machine learning program or algorithm may employ a neural network, which may be a convolutional neural network, a deep learning neural network, or a combined learning module or program that learns in two or more features or feature datasets (e.g., pixel data) in a particular areas of interest. The machine learning programs or algorithms may also include automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on imaging server(s) 102. For example, libraries may include the TENSORFLOW based library, the PYTORCH library, and/or the SCIKIT-LEARN Python library.

Machine learning may involve identifying and recognizing patterns in existing data, such as identifying coordinate data (e.g., joint location data) of the digital image (e.g., digital image 202a, 202b, and/or 202c) or related model (e.g., rough 3D model 400)) in order to facilitate making predictions or identification for subsequent data (such as using the pose mapping learning model on a new digital image in order to output a newly configured parametric model having a same or similar pose as depicted in the training images, which can then be used to map to the rough model and facilitate pose-based mapping).

Machine learning model(s), such as the pose mapping learning model described herein for some aspects, may be created and trained based upon example data (e.g., "training data" and related pixel data, LiDAR data, and/or ToF data) as inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processor(s) as described herein, to predict or classify, based on the discovered rules, relationships, or model, an expected output, score, or value.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

Various types of training images and/or training techniques may be used to train, and otherwise determine or output and/or execution of an AI model, such as a pose mapping learning model as described herein. In various aspects, image analysis may include training a machine learning based model (e.g., the pose mapping learning model) on LiDAR data, ToF data, and/or pixel data of images depicting at least a mid-section portion of the individual (e.g., infant). In some aspects, multiple AI models may be used, which may include an ensemble of models, where output from one model is used as input to the other, or where output of various models are taken together to perform or predict a value or set of values. For example, image analysis may include using a machine learning imaging model, as previously trained, to determine or output, based on the pixel data (e.g., including their L*, a*, and b* values and/or RGB values of one or more digital images, including 202a, 202b, and/or 202c) a or pose related data as determined from the training images. A deterministic model or algorithm may then be used to determine or configure a parametric model having a same or similar pose based on the pose related data. The weights of the model(s) may be trained via analysis of various LiDAR data, ToF data, and/or LAB and/or RGB values of individual pixels of a given image. For example, with respect to image 202a, pixels 202bp1 and 202bp2 may depict, or otherwise indicate, an elbow joint and hip joint respectively, where each pixel or pixel group or set comprises darker pixel color(s) and/or edges (e.g., pixels with relatively low L*values and/or pixels with lower RGB values, and groups of such pixels in certain patterns or arrangements identifying joints, etc.). In this way, LiDAR data, ToF data, and/or pixel data (e.g., detailing at least a mid-section portion of the individual (e.g., infant)) of 10,000 s training images may be used to train or use a machine learning imaging model to determine or generate a newly configured parametric model having a same or similar pose as depicted in the training images.

In various aspects, the plurality of training images (e.g., 202a, 202b, and/or 202c) depicting at least a mid-section portion of the individual (e.g., infant) comprises digital images as captured and submitted by different individuals. The images as captured may be unprocessed and/or untrimmed (e.g., "wild images") as captured by users operating computing devices 111c1-111c3 and/or 112c1-112c3, and may include mobile devices, such as mobile phones, and/or other imaging devices such as a LUMI device and its related camera. Such "wild" images may include one or more of the plurality of images captured at multiple angles or perspectives depicting at least a mid-section portion of the individual (e.g., infant). Additionally, or alternatively, the images, as submitted, may be cropped or uncropped. For example, in some aspects, one or more of the plurality of training images may comprise at least one cropped image depicting at least a mid-section portion of the individual (e.g., infant). Additionally or alternatively, the training images may comprise images as captured by digital camera (s) (e.g., whether or not included as part of a mobile device or as stand-alone digital camera). In still further aspects, additionally or alternatively, the training images may comprise simulated and/or artificial images, e.g., digital images comprising artificially rendered scenes that are fully or partially computer-generated.

FIG. 7 illustrates an example an example fitted 3D model 700, in accordance with various aspects disclosed herein. Fitted 3D model 700 depicts parametric 3D model 600 mapped to rough 3D model 400, thereby forming a more fully formed or completed model that includes both the data as captured form the digital images (e.g., 202a, 202b, and/or 202c), as used to generate rough 3D model 400, and the data from parametric 3D model 600, where the data from the parametric 3D model 600 is used to fill in gaps or complete missing or lost data of rough 3D model 400 to generate fitted 3D model 700.

In various aspects, fitted 3D model 700 may represent a best fit (e.g., most matching vertices, voxels, and/or surfaces) between a parametric mesh based model (e.g., parametric 3D model 600) and a reconstructed mesh model (e.g., rough 3D model 400). For example, mapped vertex 706v1 may represent a mapped point or coordinate within fitted 3D model 700 of the model of the individual (e.g., infant)'s chest, where vertex 406v1 of rough 3D model 400 and vertex 606v1 of parametric 3D model 600 have been mapped or fitted together. Likewise, mapped vertex 706v2 may represent a mapped point or coordinate within fitted 3D model 700 of the model of the individual (e.g., infant)'s waist, where vertex 406v2 of rough 3D model 400 and vertex 606v2 of parametric 3D model 600 have been mapped or fitted together. It is to be understood, however, that other mapping techniques, such as mapping surfaces, voxels, or mapping using mathematical formulas defining surfaces, may be used, in addition or in the alternative to, vertex based mapping in order to map parametric 3D model 600 to rough 3D model 400 for generation of fitted 3D model 700. For example, additionally, or alternatively, mapping of two models may comprise mapping the surfaces of the models together by matching the surfaces of the two models together in 3D space.

In various aspects, fitted 3D model 700 may represent a posed model that is positioned for the purpose of matching the individual (e.g., infant)'s original pose in the digital image as captured by a user. For example, fitted 3D model 800 may represent a same or original pose of any one or more of images 202a, 202b, and/or 202c.

In addition, fitted 3D model 700 may represent an unposed version of the individual (e.g., infant) as depicted in 3D or virtual space.

FIG. 8 illustrates a further example fitted 3D model 800 representing a re-posed version of the fitted 3D model 700 of FIG. 7, in accordance with various aspects disclosed herein. Fitted 3D model 800, when re-posed, maintains the mapping of fitted 3D model 700 and as described herein, for example, with respect to FIGS. 3-7. Each of FIGS. 7 and 8 represent a fitted, high quality model (e.g., having mesh lines being uniform and following streamlined circumferences around the individual (e.g., infant)'s body) may be manipulated, measured, or otherwise analyzed in 3D or virtual space.

In some aspects, fitted 3D model 800 represents a fitted parametric mesh re-posed in to a neutral standing pose. Fitted 3D model 800 may be used for taking measurements, such as determining mid-section dimensions of an individual (e.g., infant), although it is to be understood that a fitted 3D model, e.g., such as fitted 3D model 700, may be used as well.

With reference to FIG. 3, at block 308, 3D image modeling method 300 comprises determining, by the fit finder app, a mid-section dimension of the individual (e.g., infant) based on the fitted 3D model. For example, either of fitted 3D model 700 and/or fitted 3D model 800 may be measured in 3D or virtual space to determine the mid-section dimension. In various aspects, the mid-section dimension of an individual (e.g., infant) may comprise one or more of: a waist dimension, a leg dimension, or a rise dimension. Additionally, or alternatively, waist and leg dimension may be measured as circumferences (closed loop), whereas rise is open-ended (lacking a circumference).

Figure 9:
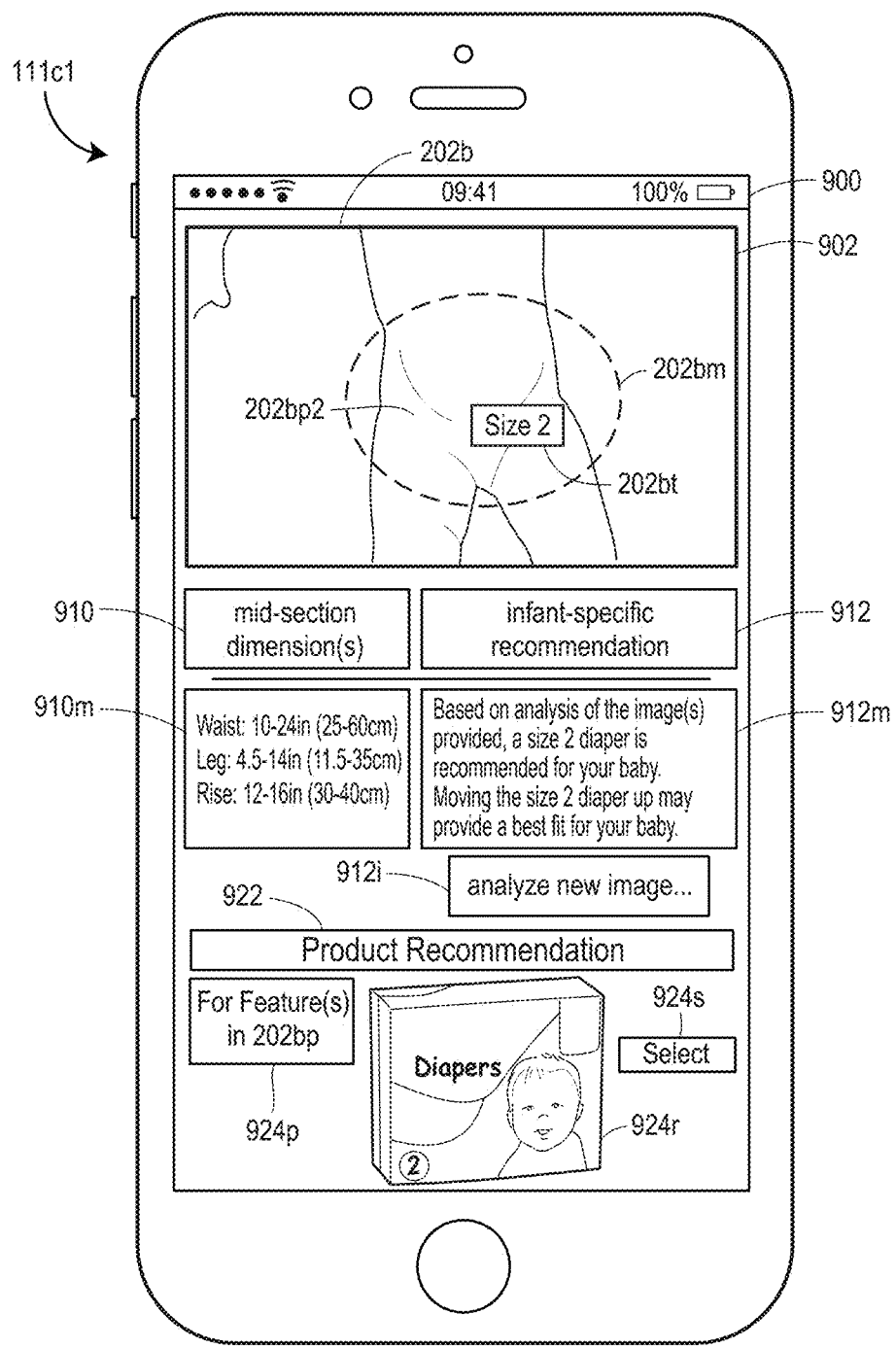
FIG. 9 illustrates an example user interface as rendered on a display screen of a user computing device in accordance with various aspects disclosed herein.

FIG. 9 illustrates an example user interface as rendered on a display screen 900 of a user computing device (e.g., user computing device 111c1) in accordance with various aspects disclosed herein. For example, as shown in the example of FIG. 9, user interface 902 may be implemented or rendered via an application (app executing on user computing device 111c1). For example, as shown in the example of FIG. 9, user interface 902 may be implemented or rendered via a native app executing on user computing device 111c1. In the example of FIG. 9, user computing device 111c1 is a user computer device as described for FIG. 1, e.g., where 111c1 is illustrated as an APPLE iPhone that implements the APPLE iOS operating system and that has display screen 900. User computing device 111c1 may execute one or more native applications (apps) on its operating system, including, for example, an imaging app (e.g., fit finder app 108) as described herein. Such native apps may be implemented or coded (e.g., as computing instructions) in a computing language (e.g., SWIFT) executable by the user computing device operating system (e.g., APPLE iOS) by the processor of user computing device 111c1. In various aspects, the imaging app (e.g., a fit finder app 108) executing on a mobile devices, such as user computing device 111c1, may be referred to as an "fit" app or "advisor" app, designed to advise the user with respect to a mid-section dimension of the individual (e.g., infant) based on analysis of the fitted 3D model, such as described herein with respect to FIGS. 1-8.

Additionally, or alternatively, user interface 902 may be implemented or rendered via a web interface, such as via a web browser application, e.g., Safari and/or Google Chrome app(s), or other such web browser or the like.

In various aspects, an individual (e.g., infant)-specific recommendation for the individual (e.g., infant) may be generated and rendered on a display screen (e.g., display screen 900). The individual (e.g., infant)-specific recommendation may comprise a textual recommendation, an imaged based recommendation, and/or a recommendation comprising a virtual rendering of a product applied to a least a portion of the fitted 3D model. For example, the recommendation may be to move a diaper on the baby, as depicted in the image, to provide better fit. Also, recommendation could be based on additional data, e.g., an individual (e.g., infant)-specific recommendation could be based on a last purchase made (e.g., last size of diaper), sibling data (e.g., data of the individual (e.g., infant)'s sibling), geographic location (e.g., a known location of where the baby lives), weight of the individual (e.g., infant), demographics of the individual (e.g., infant), or the like, which may involve data as stored in or for a profile of the user. Still further, in some aspects, an Augmented Reality (AR) recommendation may generated. In such aspects, a new product or product configuration may be rendered in real time as if it were applied to an individual (e.g., an infant). For example, a user may image an infant with a camera (e.g., camera of user computing device 111c1). After one or more image frames are captured, a rough model of the infant may be constructed as described herein (e.g., a parametric model may fitted to the rough model). A corresponding diaper recommendation may be generated based on the fitted model. The recommended diaper may be fitted to the parametric model and the parametric model may be re-posed (with the diaper) to match the current live view pose of the infant (as imaged by the camera). In some aspects, the fitted diaper may then be imaged or projected on to the live image of the infant as an AR feedback.

As shown in the example of FIG. 9, an image based representation (e.g., image 202b), with graphical annotations (e.g., pixel data 202bp identifying a hip area), textual annotations (e.g., text 202bt), mid-section portion 202bm, the mid-section dimension(s) 910, and/or the individual (e.g., infant)-specific recommendation 912 may be transmitted, via the computer network (e.g., from an imaging server 102 and/or one or more processors) to user computing device 111c1, for rendering on display screen 900. In other aspects, no transmission to the imaging server of the user's specific image occurs, where the graphical annotations (e.g., pixel data 202bp identifying a hip area), textual annotations (e.g., text 202bt), mid-section portion 202bm, and the mid-section dimension(s) 910, and/or the individual (e.g., infant)-specific recommendation 912 (and/or product specific recommendation) may instead be generated locally on an "edge" device, for example, by the fit finder app 108 executing and/or implemented on the user's mobile device (e.g., user computing device 111c1) and rendered, by a processor of the mobile device, on display screen 900 of the mobile device (e.g., user computing device 111c1). In still further aspects, image(s) may be processed locally, and then data, based on the image analysis (and where such data may include less that a complete image, e.g., such as joint data) may be transmitted to a server (e.g., server 102) for processing. Such aspects comprises the advantage of maintaining PII local on the user's phone while allowing a database (e.g., database 105) to be populated with data that can be used to improve product designs, recommendation accuracy, etc.

As shown in the example of FIG. 9, user interface 902 comprises a graphical image or representation (e.g., of image 202b) of a mid-section portion 202bm of an individual (e.g., infant). Image 202b may comprise pixel data (e.g., pixel data 202bp) of features as described herein. In the example of FIG. 9, a depiction or graphical representation of the image (e.g., image 202b) of the individual (e.g., infant) is shown together with one or more graphics (e.g., mid-section portion 202bm) and/or textual rendering(s) (e.g., text 202bt) corresponding to various features identifiable within digital image. For example, the area of mid-section portion 202bm may be annotated or overlaid on top of the image of the individual (e.g., infant) to highlight the area or feature(s) identified within the pixel data (e.g., feature data and/or raw pixel data), such as pixel 202bp2 comprising the individual (e.g., infant)'s hip area. In various aspects, the pixels identified as the specific features (e.g., pixel 202bp), may be highlighted or otherwise annotated when rendered on display screen 900.

Textual rendering (e.g., text 202bt) indicates that the individual (e.g., infant) has size 2 type waist with respect to a mid-section dimension of the individual (e.g., infant) as determined based on a fitted 3D model (e.g., fitted 3D model 700 and/or fitted 3D model 800). The "size 2" prediction or dimension indicates that the mid-section dimension of the individual (e.g., infant) corresponds to a size 2 diaper or other absorbent article size. It is to be understood that other textual rendering types or values are contemplated herein, where textual rendering types or values may be rendered, for example, to indicate waist dimension, leg or thigh dimension, rise dimension, and/or other values as described herein.

As shown for FIG. 9, user interface 902 may also include or render a mid-section dimension(s) 910. In the aspect of FIG. 9, the mid-section dimension(s) 910 comprises a message 910m designed to indicate a mid-section dimension values corresponding to the features detected in the image (e.g., image 202b) of individual (e.g., infant), as based on analysis and measurement of a fitted model (e.g., fitted 3D model 700 and/or fitted 3D model 800). As shown in the example of FIG. 9, message 910m indicates that the waist of the individual (e.g., infant) depicted in image 202b is 10-24 inches (25-60 cm), the leg or thigh of the individual (e.g., infant) depicted in image 202b is 4.5-14 inches (11.5-35 cm), and the rise of the individual (e.g., infant) depicted in image 202b is 12-16 inches (30-40 cm).

As further shown for FIG. 9, an individual (e.g., infant)-specific recommendation 912, based on feature(s) identifiable within the digital image (e.g., image 202b) and/or as determined from the fitted 3D model (e.g., fitted 3D model 700 and/or fitted 3D model 800), may be rendered on display screen 900. Such individual (e.g., infant)-specific recommendation may comprise a recommendation or assessment specific to the individual (e.g., infant), and more, particularly specific to the individual (e.g., infant)'s mid-section. Additionally, or alternatively, such individual (e.g., infant)-specific recommendation, as rendered on the display screen 900, may further comprise instructions for treating or addressing any issues or possible issues identifiable in the pixel data of the digital image of comprising the mid-section portion 202bm of the individual (e.g., infant). As shown for individual (e.g., infant)-specific recommendation 912, message 912m comprises an example individual (e.g., infant)-specific recommendation corresponding to the individual related to image 202b. Message 912m includes a specific recommendation to the user a size 2 diaper is a recommended size for the individual (e.g., infant) in the image 202b (e.g., "based on analysis of the image(s) provided, a size 2 diaper is recommended for your baby") and that moving a size 2 diaper up on the individual (e.g., infant) is further recommended (e.g., "moving the size 2 diaper up may provide a best fit for your baby"). In the example of FIG. 9, the individual (e.g., infant)-specific recommendation may be based on the dimensions identified in 3D or virtual space my measurement of the fitted 3D model 700 and/or the fitted 3D model 800.

In some aspects, fit finder app 108 may be configured to render through a field of view or display screen of an augmented reality (AR) device, a virtual representation of the individual (e.g., infant)-specific recommendation based on the digital image (e.g., digital image 202b) and/or the fitted 3D model (e.g., fitted 3D model 700 and/or fitted 3D model 800). In some aspects, the display screen may be a display screen (e.g., display screen 900) of a computing device (e.g., computing device 111c1), that can render AR and/or VR images, such as an IPHONE or GOOGLE ANDROID device implementing and AR and/or VR application, such as the GOOGLE CARDBOARD app or the like. It is to be understood that AR images, and/or AR related data or information, may be rendered on a display screen (e.g., display screen 900) without any immersion (e.g., without VR immersion), where, in such aspects, the AR images, data, and/or information may be superimposed or overlaid on the display screen with one or more frame(s) as captured by a camera of the user computing device (e.g., of user computing device 111c1). Additionally, or alternatively, AR imagery may be displayed on other screens and/or display devices (e.g., such as a television (TV) display, tablet display, VR/AR device display, and/or the like). In such aspects, the virtual representation of the individual (e.g., infant)-specific recommendation may be superimposed on one or more images of the individual (e.g., infant). For example, the AR and/or VR image may indicate the size of diaper or may show a correct size diaper as superimposed on the individual (e.g., infant) within the image. Additionally, or alternatively, the virtual representation of the individual (e.g., infant)-specific recommendation may further include, provide, or render (e.g., on display screen 900) daily care practice advice, such as how to apply a diaper-position and tightness of a diaper relative to cuff, waist, crotch, fastening, and the like.

In various aspects, an individual (e.g., infant)-specific recommendation may comprise a product recommendation for a manufactured product. For example, the product recommendation may comprise an absorbent article (e.g., diaper) size or type recommendation for the individual (e.g., infant). Additionally, or alternatively, the product recommendation may comprise a product size (e.g., small, medium, large and/or number size, 0, 1, 2, 3, etc.) as determined by comparing the mid-section dimension (e.g., mid-section dimension 202bm, including any one of waist, leg, or rise) of the individual (e.g., infant) to a product range of a product type. Such analysis may comprise comparing the dimensions of the individual (e.g., infant) to the dimensions of an existing set of products, and finding a closest match or fit. Such analysis may further include determining the individual (e.g., infant)'s dimensions, e.g., from fitted 3D model 700 and/or fitted 3D model 800 and generating a product recommendation as selected from a lineup of one or more pre-existing products and their respective shapes, dimensions, attributes, sizes, and/or the like.

For example, with further reference to FIG. 9, an individual (e.g., infant)-specific recommendation may further comprise a product recommendation for a manufactured product. In addition, the individual (e.g., infant)-specific recommendation may be displayed on a display screen (e.g., display screen 900) with instructions for using or applying the manufactured product with respect to the mid-section of the individual (e.g., infant) as depicted within the digital image (e.g., image 202b) and/or as otherwise determined from a fitted model (e.g., fitted 3D model 700 and/or fitted 3D model 800). For example, message 912m recommends use of a diaper size 2, which may be a best fit for the individual (e.g., infant) of image 202b. The diaper size recommendation may be made based on the mid-section dimension(s) 910.

More generally, product recommendations, may include, by way of non-limiting example, a recommendation for an optimal diaper or diaper size, e.g., to prevent blowouts and/or leaks for the individual. In addition, product recommendations may assist a user to identify optimal products based on an individual's changing skin needs (e.g., products such as diapers, body wash, creams, lotions, ointments, and the like) and/or activity level, and the like.

In the example of FIG. 9, user interface 902 renders or provides a recommended product (e.g., manufactured product 924r) as determined by the fit finder app 108 and the related image analysis of image 202b and its pixel data and/or fitted models (e.g., fitted 3D model 700 and/or fitted 3D model 800). In the example of FIG. 9, this is indicated and annotated (924p) on user interface 902.

User interface 902 may further include a selectable user interface (UI) button 924s to allow the user (to select for purchase or shipment the corresponding product (e.g., manufactured product 924r). In some aspects, selection of selectable UI button 924s may cause the recommended product(s) to be shipped to the user and/or may notify a third party that the individual is interested in the product(s). For example, either user computing device 111c1 and/or imaging server(s) 102 may initiate, based on the mid-section dimension(s) 910 and/or the individual (e.g., infant)-specific recommendation 912, the manufactured product 924r (e.g., diaper size 2) for shipment to the user. In such aspects, the product may be packaged and shipped to the user.

In various aspects, the individual (e.g., infant)-specific recommendation is rendered on the display screen in real-time or near-real time, during, or after obtaining, the one or more digital images depicting at least a mid-section portion of the individual (e.g., infant). For example, with respect to FIG. 9, any one or more of graphical representations, images (e.g., image 202b), with graphical annotations (e.g., mid-section portion 202bm), textual annotations (e.g., text 202bt), mid-section dimension(s) 910, individual (e.g., infant)-specific recommendation 912, and/or product recommendation 922 may be rendered (e.g., rendered locally on display screen 900) in real-time or near-real time during or after receiving, the digital image. In aspects where the image is analyzed by imaging server(s) 102, the image may be transmitted and analyzed in real-time or near real-time by imaging server(s) 102.

In some aspects, a user may provide a new image that may be transmitted to imaging server(s) 102 for updating, retraining, or reanalyzing by fit finder app 108 and/or a pose mapping learning model. In other aspects, a new image that may be locally received on computing device 111c1 and analyzed, by fit finder app 108, on the computing device 111c1. For example, as shown in the example of FIG. 9, the user may select selectable button 912i for reanalyzing (e.g., either locally at computing device 111c1 or remotely at imaging server(s) 102) a new digital image. Selectable button 912i may cause user interface 902 to prompt the user to attach or capture for analyzing a new image. Imaging server(s) 102 and/or a user computing device, such as user computing device 111c1, may receive a new image comprising LiDAR data, ToF data, and/or pixel data of the digital image comprising at least a mid-section of an individual (e.g., infant).

In various aspects, a new image or set of images may be used to generate a second fitted 3D model. For example, a second fitted 3D model may be generated based on a second set of one or more digital images of the individual (e.g., infant). The fit finder app (e.g., fit finder app 108) may then determine a second mid-section dimension of the individual (e.g., infant) based on the second fitted 3D model. The second mid-section dimension is determined at a second time and comprises a difference from the mid-section dimension of the individual (e.g., infant) determined at a first time (e.g., the individual (e.g., infant) of images 202a, 202b, and/or 202c). In such aspects, an individual (e.g., infant)-specific recommendation may include a recommendation to increase or decrease a size or type of product (e.g., diaper) based on the difference between the second mid-section dimension and the mid-section dimension of the individual (e.g., infant). Such aspects may comprise tracking individual (e.g., infant) growth over time and allow for recommendations over time (e.g., "your baby has grown; it's time to size up to the next size," which could be displayed with or in place of message 912m).

In additional aspects, a difference in time between the first time and the second time may be at least one of a: one or more days; one or more weeks; or one or more months. Additionally, or alternatively, a recommendation to increase or decrease the size or type of product (e.g., a diaper or otherwise absorbent article) may comprise a predicted future time at which to increase or decrease the size or type of product. In such aspects, the predicted future time may be based on a growth curve determined for a time between the images taken at the first time and the second time. This allows the fit finder app (e.g., fit finder app 108) to determine when an individual (e.g., infant) might need to change diaper size (e.g., "in 15 days, we suggest you move to Size 3," which may be displayed with or in place of message 912m).

Aspects of the Disclosure

The following aspects are provided as examples in accordance with the disclosure herein and are not intended to limit the scope of the disclosure.

1. A three-dimensional (3D) image modeling method for determining respective mid-section dimensions of individuals, the 3D image modeling method comprising: obtaining, by one or more processors, one or more digital images of an individual, each of the one or more digital images depicting at least a mid-section portion of the individual; determining, by a fit finder application (app) executing on the one or more processors, a rough 3D model based on the one or more digital images; mapping, by the fit finder app, a parametric 3D model of a predefined individual to the rough 3D model in virtual 3D space to generate a fitted 3D model, the fitted 3D model indicative of a physical size of at least the mid-section portion of the individual in ordinary space; and determining, by the fit finder app, a mid-section dimension of the individual based on the fitted 3D model.
2. The 3D image modeling method of aspect 1, wherein the mid-section dimension of the individual comprises one or more of: a waist dimension, a leg dimension, or a rise dimension.
3. The 3D image modeling method of any one of aspects 1-2, wherein the rough 3D model comprises a rough surface of at least the mid-section portion of the individual in virtual 3D space, wherein the parametric 3D model comprises a refined surface of at least a mid-section portion of the predefined individual in virtual 3D space, and wherein generating the fitted 3D model comprises mapping the refined surface to the rough surface.
4. The 3D image modeling method of any one of aspects 1-3 further comprising: determining, by the fit finder app, a pose of the individual based on the one or more digital images or the rough 3D model, and wherein mapping the rough 3D model to the parametric 3D model further comprises outputting or manipulating the parametric 3D model into a same pose as the pose of the individual.
5. The 3D image modeling method of claim 4, wherein mapping the rough 3D model to the parametric 3D model further comprises inputting the one or more digital images into a pose mapping learning model electronically accessible by the fit finder app, wherein the pose mapping learning model is trained with coordinate data or pixel data of a plurality of training digital images depicting at least respective mid-section portions of individuals in 3D space, the pose mapping learning model configured to output or manipulate the parametric 3D model into a same pose as respective poses of the individuals of the plurality of training digital images.
6. The 3D image modeling method of any one of aspects 1-5 further comprises generating, based on the mid-section dimension of the individual, an individual-specific recommendation for the individual, the individual-specific recommendation rendered on a display screen.
7. The 3D image modeling method of aspect 6, wherein the individual-specific recommendation comprises a product recommendation for a manufactured product.
8. The 3D image modeling method of aspect 7, wherein the product recommendation comprises an absorbent article size or type recommendation for the individual.
9. The 3D image modeling method of aspect 8, wherein the product recommendation comprises a product size as determined by comparing the mid-section dimension of the individual to a product range of a product type.
10. The 3D image modeling method of aspect 6, wherein the individual-specific recommendation comprises a textual recommendation, an imaged based recommendation, or a recommendation comprising a virtual rendering of a product applied to a least a portion of the fitted 3D model.
11. The 3D image modeling method of aspect 6, wherein the individual-specific recommendation is rendered on the display screen in real-time or near-real time, during, or after obtaining, the one or more digital images depicting at least a mid-section portion of the individual.
12. The 3D image modeling method of aspect 6 further comprising: generating a second fitted 3D model based on a second set of one or more digital images of the individual; and determining, by the fit finder app, a second mid-section dimension of the individual based on the second fitted 3D model, wherein the second mid-section dimension is determined at a second time comprises a difference from the mid-section dimension of the individual determined at a first time, and wherein the individual-specific recommendation comprises a recommendation to increase or decrease a size or type of product based on the difference between the second mid-section dimension and the mid-section dimension of the individual.
13. The 3D image modeling method of aspect 12, wherein a difference in time between the first time and the second time is at least one of a: one or more days; one or more weeks; or one or more months.
14. The 3D image modeling method of aspect 12, wherein the recommendation to increase or decrease the size or type of product comprises a predicted future time at which to increase or decrease the size or type of product.
15. A three-dimensional (3D) image modeling system configured to determine respective mid-section dimensions of individuals, the 3D image modeling system comprising: one or more processors; a fit finder application (app) comprising computing instructions configured to execute on the one or more processors, wherein the computing instructions of the fit finder app when executed by the one or more processors, cause the one or more processors to: obtain, by the one or more processors, one or more digital images of an individual, each of the one or more digital images depicting at least a mid-section portion of the individual; determine, by the fit finder app executing on the one or more processors, a rough 3D model based on the one or more digital images; map, by the fit finder app, a parametric 3D model of a predefined individual to the rough 3D model in virtual 3D space to generate a fitted 3D model, the fitted 3D model indicative of a physical size of at least the mid-section portion of the individual in ordinary space; and determine, by the fit finder app, a mid-section dimension of the individual based on the fitted 3D model.
16. The 3D image modeling system of aspect 15, wherein the mid-section dimension of the individual comprises one or more of: a waist dimension, a leg dimension, or a rise dimension.
17. The 3D image modeling system of any one of aspects 15-16, wherein the rough 3D model comprises a rough surface of at least the mid-section portion of the individual in virtual 3D space, wherein the parametric 3D model comprises a refined surface of at least a mid-section portion of the predefined individual in virtual 3D space, and wherein generating the fitted 3D model comprises mapping the refined surface to the rough surface.
18. The 3D image modeling system of any one of aspects 15-17, wherein the computing instructions of the fit finder app when executed by the one or more processors, cause the one or more processors to: determine a pose of the individual based on the one or more digital images or the rough 3D model, and wherein mapping the rough 3D model to the parametric 3D model further comprises outputting or manipulating the parametric 3D model into a same pose as the pose of the individual.

19. The 3D image modeling system of aspect 18, wherein mapping the rough 3D model to the parametric 3D model further comprises inputting the one or more digital images into a pose mapping learning model electronically accessible by the fit finder app, wherein the pose mapping learning model is trained with coordinate data or pixel data of a plurality of training digital images depicting at least respective mid-section portions of individuals in 3D space, the pose mapping learning model configured to output or manipulate the parametric 3D model into a same pose as respective poses of the individuals of the plurality of training digital images.

20. A tangible, non-transitory computer-readable medium storing instructions for, determining respective mid-section dimensions of individuals that when executed by one or more processors cause the one or more processors to: obtain one or more digital images of an individual, each of the one or more digital images depicting at least a mid-section portion of the individual; determine a rough 3D model based on the one or more digital images; map a parametric 3D model of a predefined individual to the rough 3D model in virtual 3D space to generate a fitted 3D model, the fitted 3D model indicative of a physical size of at least the mid-section portion of the individual in ordinary space; and determine a mid-section dimension of the individual based on the fitted 3D model.

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited.

The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A three-dimensional (3D) image modeling method for determining respective mid-section dimensions of individuals, the 3D image modeling method comprising:
    obtaining, by one or more processors, one or more digital images of an individual, each of the one or more digital images depicting at least a mid-section portion of the individual;
    determining, by a fit finder application (app) executing on the one or more processors, a rough 3D model based on the one or more digital images;
    mapping, by the fit finder app, a parametric 3D model of a predefined individual to the rough 3D model in virtual 3D space to generate a fitted 3D model, the fitted 3D model indicative of a physical size of at least the mid-section portion of the individual in ordinary space; and
    determining, by the fit finder app, a mid-section dimension of the individual based on the fitted 3D model.

2. The 3D image modeling method of claim 1, wherein the mid-section dimension of the individual comprises one or more of: a waist dimension, a leg dimension, or a rise dimension.

3. The 3D image modeling method of claim 1, wherein the rough 3D model comprises a rough surface of at least the mid-section portion of the individual in virtual 3D space, wherein the parametric 3D model comprises a refined surface of at least a mid-section portion of the predefined individual in virtual 3D space, and wherein generating the fitted 3D model comprises mapping the refined surface to the rough surface.

4. The 3D image modeling method of claim 1 further comprising:
    determining, by the fit finder app, a pose of the individual based on the one or more digital images or the rough 3D model, and wherein mapping the rough 3D model to the parametric 3D model further comprises outputting or manipulating the parametric 3D model into a same pose as the pose of the individual.

5. The 3D image modeling method of claim 4, wherein mapping the rough 3D model to the parametric 3D model further comprises inputting the one or more digital images into a pose mapping learning model electronically accessible by the fit finder app,
    wherein the pose mapping learning model is trained with coordinate data or pixel data of a plurality of training digital images depicting at least respective mid-section portions of individuals in 3D space, the pose mapping learning model configured to output or manipulate the parametric 3D model into a same pose as respective poses of the individuals of the plurality of training digital images.

6. The 3D image modeling method of claim 1 further comprises generating, based on the mid-section dimension of the individual, an individual-specific recommendation for the individual, the individual-specific recommendation rendered on a display screen.

7. The 3D image modeling method of claim 6, wherein the individual-specific recommendation comprises a product recommendation for a manufactured product.

8. The 3D image modeling method of claim 7, wherein the product recommendation comprises an absorbent article size or type recommendation for the individual.

9. The 3D image modeling method of claim 8, wherein the product recommendation comprises a product size as determined by comparing the mid-section dimension of the individual to a product range of a product type.

10. The 3D image modeling method of claim 6, wherein the individual-specific recommendation comprises a textual recommendation, an imaged based recommendation, or a recommendation comprising a virtual rendering of a product applied to a least a portion of the fitted 3D model.

11. The 3D image modeling method of claim 6, wherein the individual-specific recommendation is rendered on the display screen in real-time or near-real time, during, or after obtaining, the one or more digital images depicting at least a mid-section portion of the individual.

12. The 3D image modeling method of claim 6 further comprising:
    generating a second fitted 3D model based on a second set of one or more digital images of the individual; and
    determining, by the fit finder app, a second mid-section dimension of the individual based on the second fitted 3D model,
    wherein the second mid-section dimension is determined at a second time comprises a difference from the mid-section dimension of the individual determined at a first time, and
    wherein the individual-specific recommendation comprises a recommendation to increase or decrease a size or type of product based on the difference between the second mid-section dimension and the mid-section dimension of the individual.

13. The 3D image modeling method of claim 12, wherein a difference in time between the first time and the second time is at least one of a: one or more days; one or more weeks; or one or more months.

14. The 3D image modeling method of claim 12, wherein the recommendation to increase or decrease the size or type of product comprises a predicted future time at which to increase or decrease the size or type of product.

15. A three-dimensional (3D) image modeling system configured to determine respective mid-section dimensions of individuals, the 3D image modeling system comprising:
    one or more processors;
    a fit finder application (app) comprising computing instructions configured to execute on the one or more processors,
    wherein the computing instructions of the fit finder app when executed by the one or more processors, cause the one or more processors to:
    obtain, by the one or more processors, one or more digital images of an individual, each of the one or more digital images depicting at least a mid-section portion of the individual;

determine, by the fit finder app executing on the one or more processors, a rough 3D model based on the one or more digital images;

map, by the fit finder app, a parametric 3D model of a predefined individual to the rough 3D model in virtual 3D space to generate a fitted 3D model, the fitted 3D model indicative of a physical size of at least the mid-section portion of the individual in ordinary space; and determine, by the fit finder app, a mid-section dimension of the individual based on the fitted 3D model.

16. The 3D image modeling system of claim 15, wherein the mid-section dimension of the individual comprises one or more of: a waist dimension, a leg dimension, or a rise dimension.

17. The 3D image modeling system of claim 15, wherein the rough 3D model comprises a rough surface of at least the mid-section portion of the individual in virtual 3D space, wherein the parametric 3D model comprises a refined surface of at least a mid-section portion of the predefined individual in virtual 3D space, and wherein generating the fitted 3D model comprises mapping the refined surface to the rough surface.

18. The 3D image modeling system of claim 15, wherein the computing instructions of the fit finder app when executed by the one or more processors, cause the one or more processors to:

determine a pose of the individual based on the one or more digital images or the rough 3D model, and wherein mapping the rough 3D model to the parametric 3D model further comprises outputting or manipulating the parametric 3D model into a same pose as the pose of the individual.

19. The 3D image modeling system of claim 18, wherein mapping the rough 3D model to the parametric 3D model further comprises inputting the one or more digital images into a pose mapping learning model electronically accessible by the fit finder app, wherein the pose mapping learning model is trained with coordinate data or pixel data of a plurality of training digital images depicting at least respective mid-section portions of individuals in 3D space, the pose mapping learning model configured to output or manipulate the parametric 3D model into a same pose as respective poses of the individuals of the plurality of training digital images.

20. A tangible, non-transitory computer-readable medium storing instructions for, determining respective mid-section dimensions of individuals that when executed by one or more processors cause the one or more processors to: obtain one or more digital images of an individual, each of the one or more digital images depicting at least a mid-section portion of the individual;

determine a rough 3D model based on the one or more digital images;

map a parametric 3D model of a predefined individual to the rough 3D model in virtual 3D space to generate a fitted 3D model, the fitted 3D model indicative of a physical size of at least the mid-section portion of the individual in ordinary space; and determine a mid-section dimension of the individual based on the fitted 3D model.

* * * * *